(12) United States Patent
Doshi et al.

(10) Patent No.: US 11,630,706 B2
(45) Date of Patent: Apr. 18, 2023

(54) ADAPTIVE LIMITED-DURATION EDGE RESOURCE MANAGEMENT

(71) Applicant: Intel Corporation, Santa Clara, CA (US)

(72) Inventors: Kshitij Arun Doshi, Tempe, AZ (US); Francesc Guim Bernat, Barcelona (ES); Ned M. Smith, Beaverton, OR (US); Christian Maciocco, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 24 days.

(21) Appl. No.: 17/028,809

(22) Filed: Sep. 22, 2020

(65) Prior Publication Data

US 2021/0011765 A1  Jan. 14, 2021

(51) Int. Cl.
*G06F 9/48* (2006.01)
*G06F 9/50* (2006.01)

(52) U.S. Cl.
CPC .............. *G06F 9/5083* (2013.01); *G06F 9/48* (2013.01); *G06F 9/4843* (2013.01); *G06F 9/4881* (2013.01); *G06F 9/50* (2013.01); *G06F 9/505* (2013.01); *G06F 9/5005* (2013.01); *G06F 9/5011* (2013.01); *G06F 9/5027* (2013.01);
(Continued)

(58) Field of Classification Search
CPC ........ G06F 9/50; G06F 9/5005; G06F 9/5011; G06F 9/5027; G06F 9/5038; G06F 9/505; G06F 9/5061; G06F 9/5072; G06F 9/5077; G06F 9/5083; G06F 9/48; G06F 9/4843; G06F 9/4881
See application file for complete search history.

(56) References Cited

U.S. PATENT DOCUMENTS

| 2011/0185364 | A1* | 7/2011 | Fernandes | G06F 9/5083 |
| | | | | 718/104 |
| 2011/0231853 | A1* | 9/2011 | Murray | H04L 41/00 |
| | | | | 718/103 |

(Continued)

FOREIGN PATENT DOCUMENTS

| CN | 114257599 | 3/2022 |
| DE | 102021209146 | 3/2022 |

OTHER PUBLICATIONS

Cui et al, "A Reinforcement Learning-Based Mixed Job Scheduler Scheme for Grid or IaaS Cloud", IEEE, published on Nov. 14, 2017, pp. 1030-1039 (Year: 2017).*

(Continued)

*Primary Examiner* — Charles M Swift
(74) *Attorney, Agent, or Firm* — Schwegman Lundberg & Woessner, P.A.

(57) ABSTRACT

Systems and techniques for adaptive limited-duration edge resource management are described herein. Available capacity may be calculated for a resource for a node of the edge computing network based on workloads executing on the node. Available set-aside resources may be determined based on the available capacity. A service request may be received from an application executing on the edge computing node. A priority category may be determined for the service request. Set-aside resources from the available set-aside resources may be assigned to a workload associated with the service request based on the priority category.

24 Claims, 19 Drawing Sheets

(52) U.S. Cl.
CPC .......... G06F 9/5061 (2013.01); G06F 9/5072 (2013.01)

(56) References Cited

U.S. PATENT DOCUMENTS

| | | | |
|---|---|---|---|
| 2015/0264122 A1* | 9/2015 | Shau .................... | G06F 9/5061 709/203 |
| 2016/0085654 A1* | 3/2016 | Khoury ................ | G06F 9/5011 710/17 |
| 2018/0054395 A1* | 2/2018 | Carey ................ | G06F 11/2041 |
| 2019/0004858 A1* | 1/2019 | Bernat .................... | H04W 8/22 |
| 2019/0303197 A1* | 10/2019 | Li ........................ | G06K 9/6217 |
| 2020/0301735 A1* | 9/2020 | Accapadi .............. | G06F 9/5038 |
| 2020/0344322 A1* | 10/2020 | Zhu ........................ | G06F 16/27 |

OTHER PUBLICATIONS

"German Application Serial No. 102021209146.6, Office Action dated Jan. 5, 2022", w o English translation, 3 pgs.
"German Application Serial No. 102021209146.6, Response filed Jan. 11, 2022 to Office Action dated Jan. 5, 2022", w o English claims, 7 pgs.

* cited by examiner

ADAPTIVE LIMITED-DURATION EDGE RESOURCE MANAGEMENT

TECHNICAL FIELD

Embodiments described herein generally relate to computing resource management and, in some embodiments, more adaptive limited-duration resource management for edge computing devices and operational scenarios.

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office, a vehicle such as a car/bus/train/etc., a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, machine learning/ artificial intelligence services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and network function services for example security services, and applications at locations closer to the edge of the network.

Resource management in multi-tenant edge networks provides resource consuming workloads with needed resources for achieving a desired quality of experience (e.g., quality of service). If a workload or a portion of the workload that is scheduled at a node in an edge network receives insufficient resources at that node, the workload may be unable to complete requests for service in a timely manner. For example, it may appear to a client which submits requests that the service delivered to the client by the edge network is slower, unavailable, or unreliable. Further as example, the edge network may appear to the client as being unpredictable where by at different times the client may find that some requests fail to generate a response without any apparent reason. Thus, nodes in an edge computing network manage the resources provided to different tenant workloads to improve the desired qualities of experience.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Computing in edge clouds is highly decentralized. It is emerging as a special category of operations in which events and requests and data streams are processed in a manner that should lead to lower and deterministic latency responses. An edge network may include a concept of three tier computation and data processing with edge as a middle tier. In that tier, many different edge computing, communication, and storage resources are aggregated flexibly and dynamically. The resources may be arranged in hierarchical or peer-to-peer relationships for meeting response-time and communication bandwidth critical needs locally and mobilizing the deeper and richer resource networks in traditional clouds for complex, computation intensive, operations.

Figure 1:
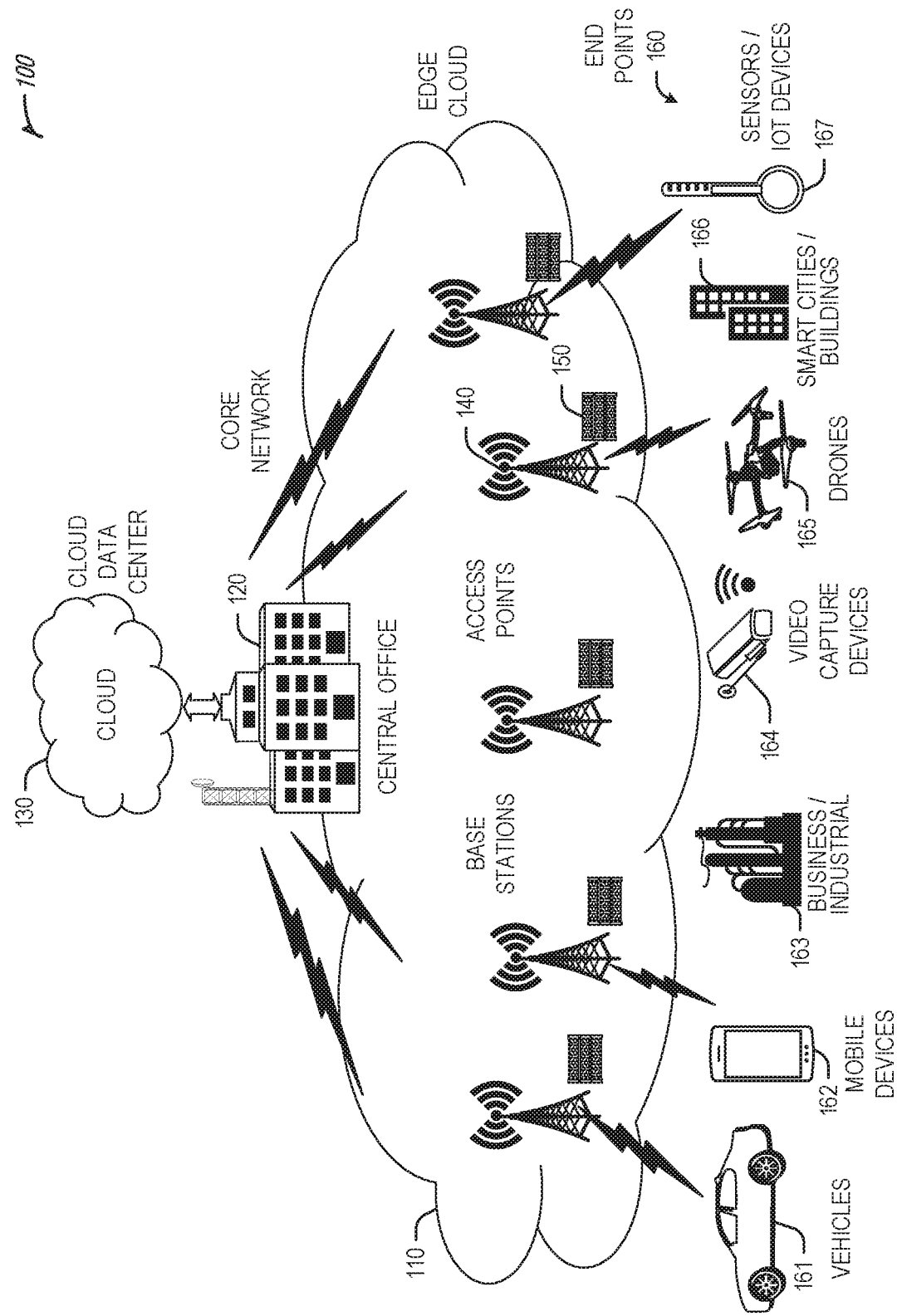
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
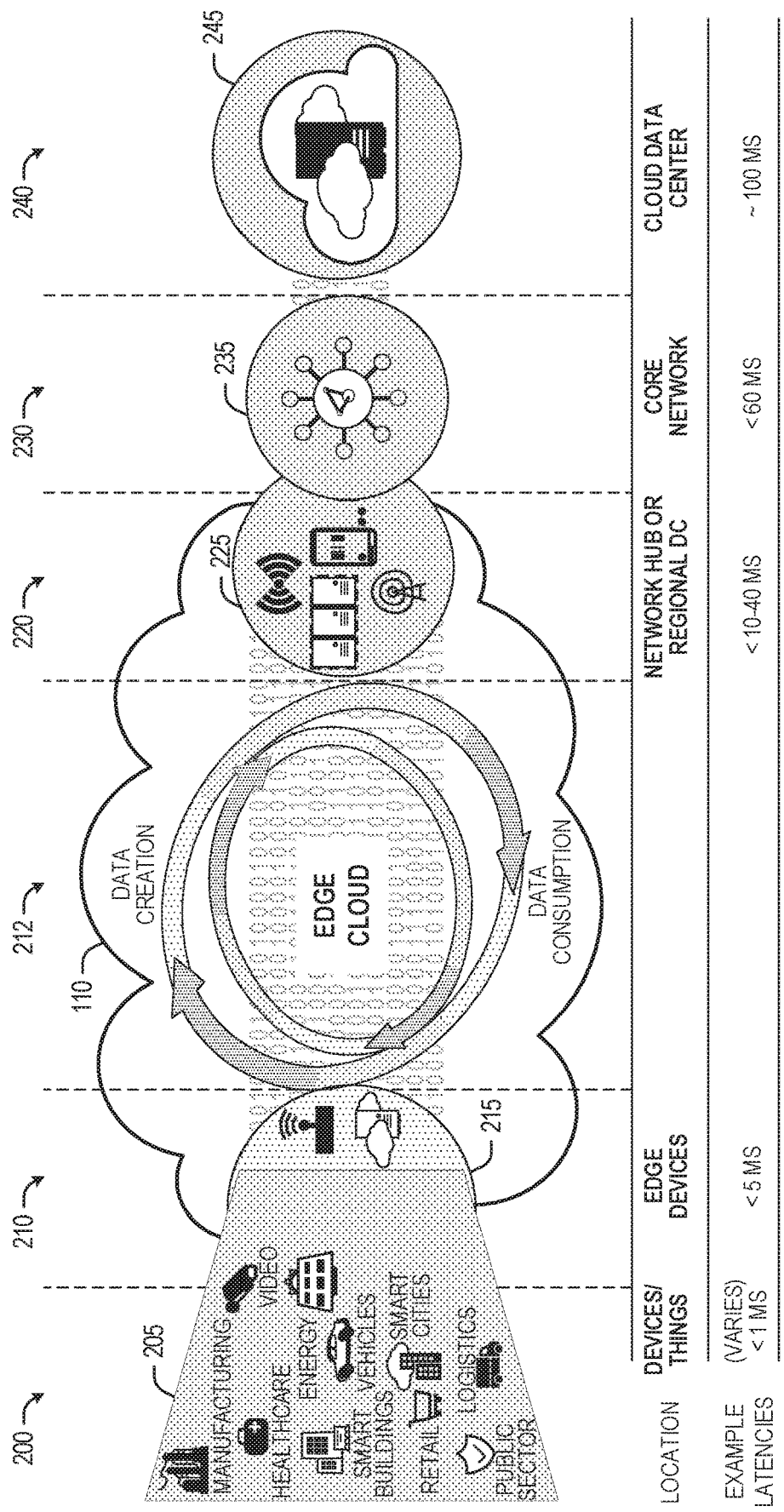
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge". "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local". "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may be an appliance computing device that is a self-contained processing system including a housing, case or shell. In some cases, edge devices are devices presented in the network for a specific purpose (e.g., a traffic light), but that have processing or other capacities that may be harnessed for other purposes. Such edge devices may be independent from other networked devices and provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may implement a virtual computing environment such as a hypervisor for deploying virtual machines, an operating system that implements containers, etc. Such virtual computing environments provide an execution environment in which one or more applications may execute while being isolated from one or more other applications.

Figure 3:
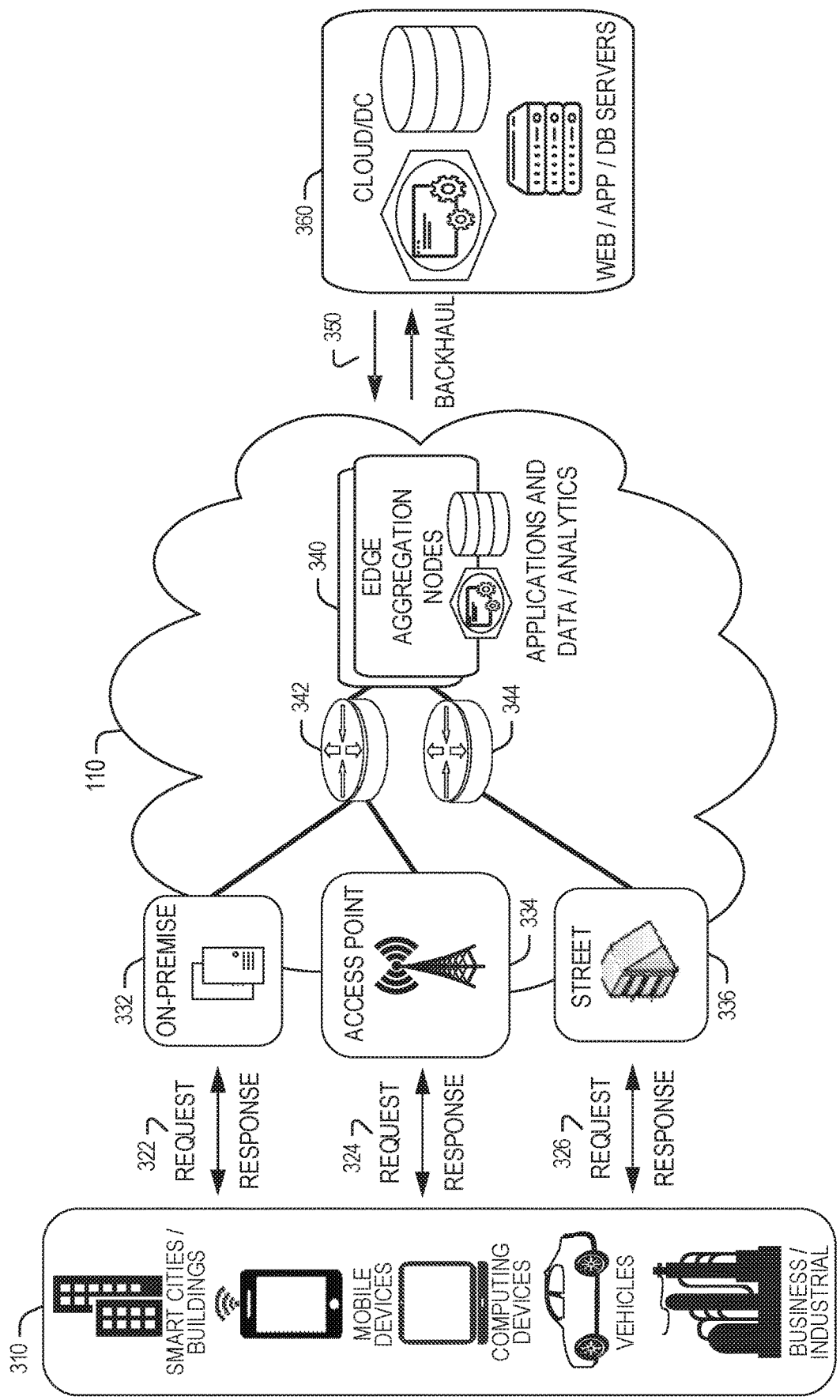
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
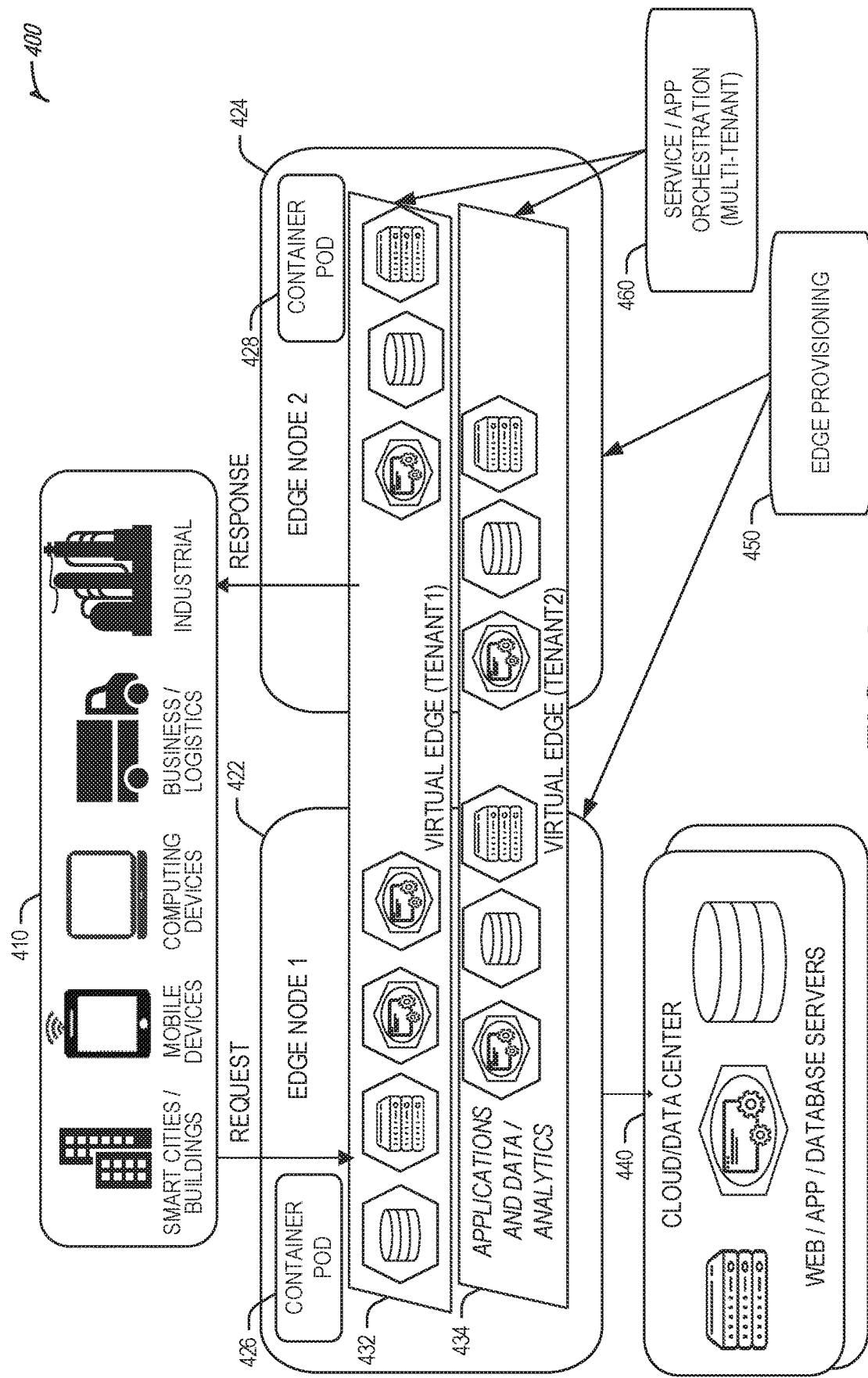
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines. Servlets, servers, or other computation abstraction may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
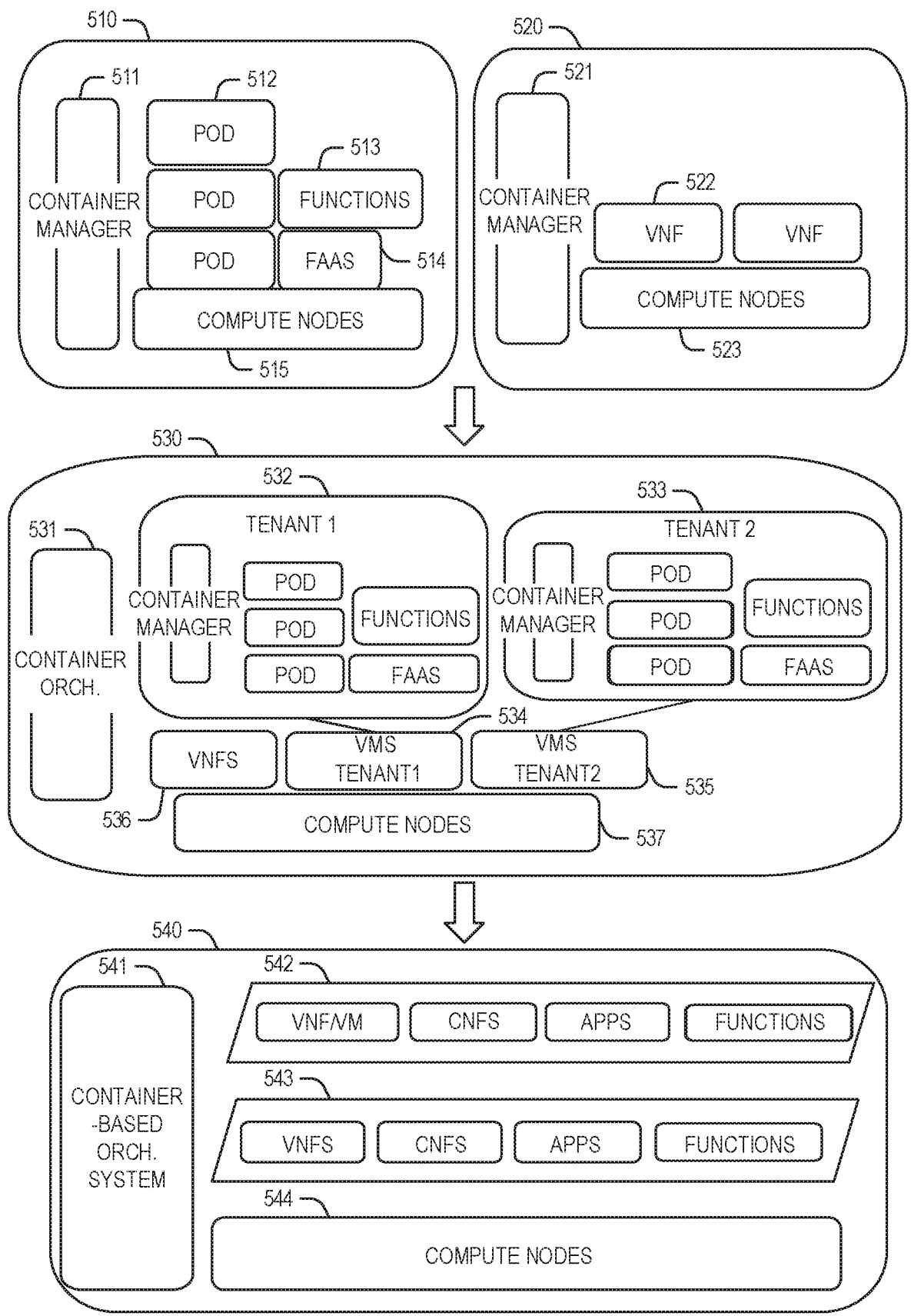
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs. Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
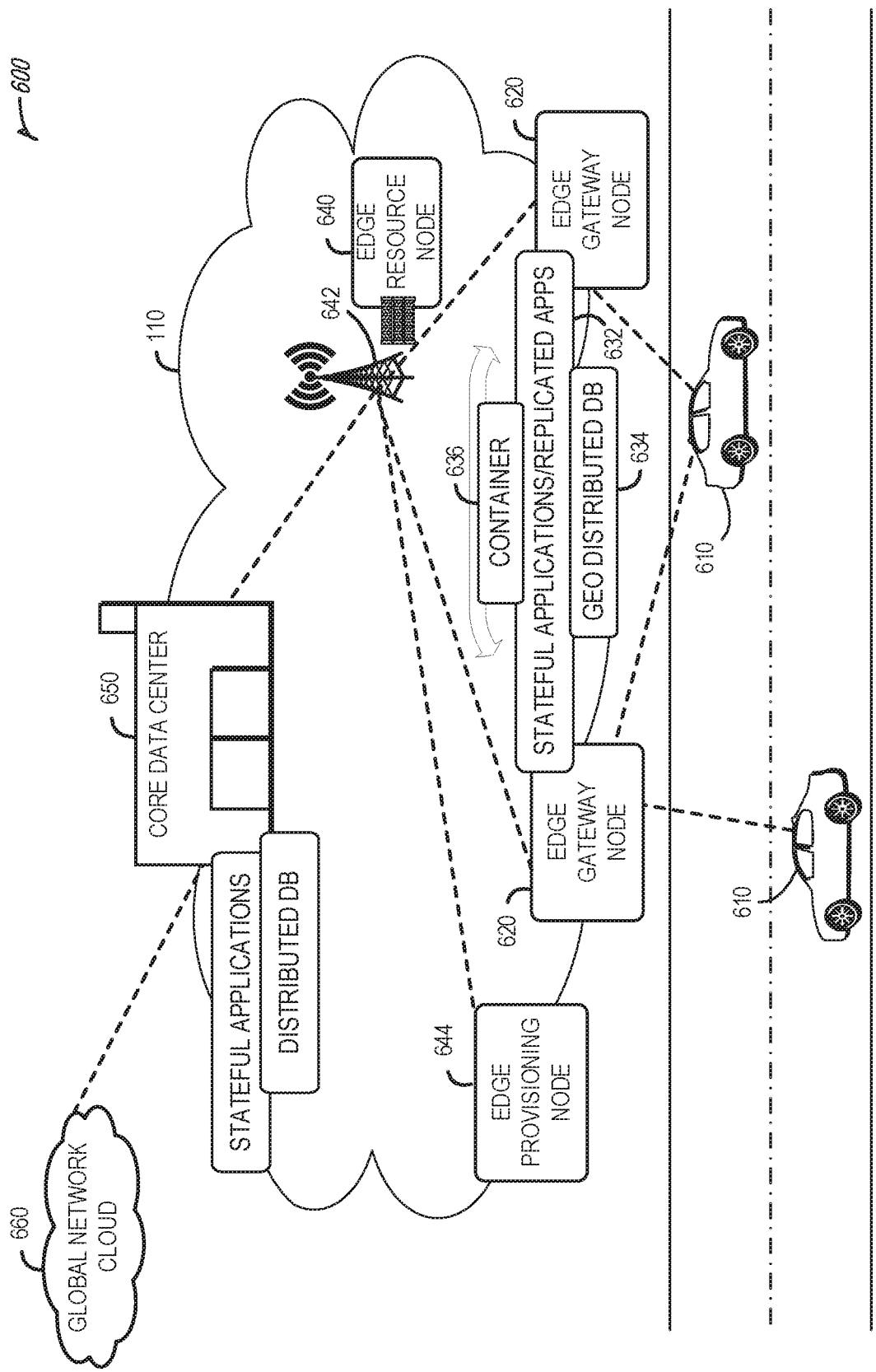
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a based station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 can be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different components of the computer readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
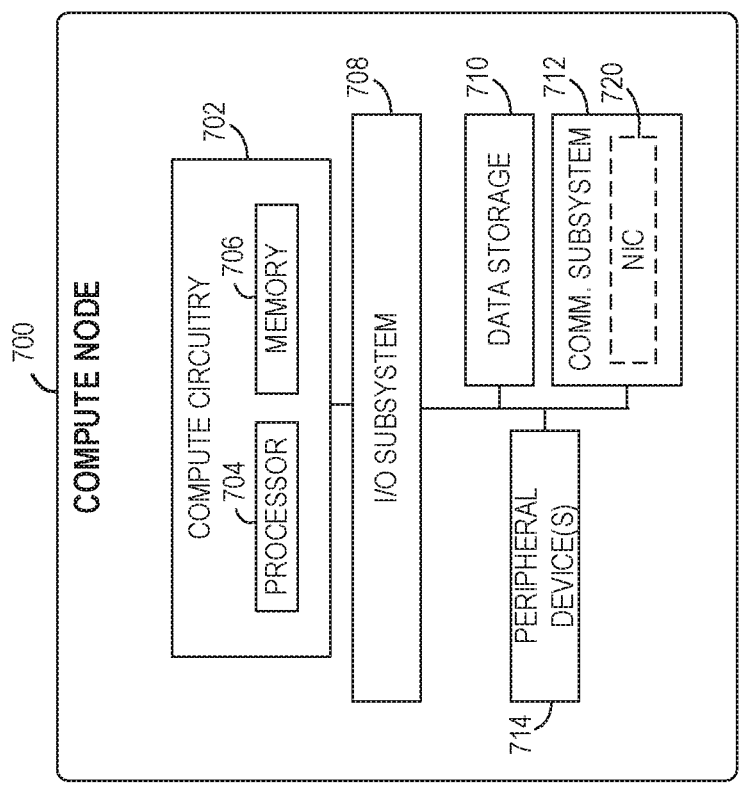
FIG. 7A provides an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
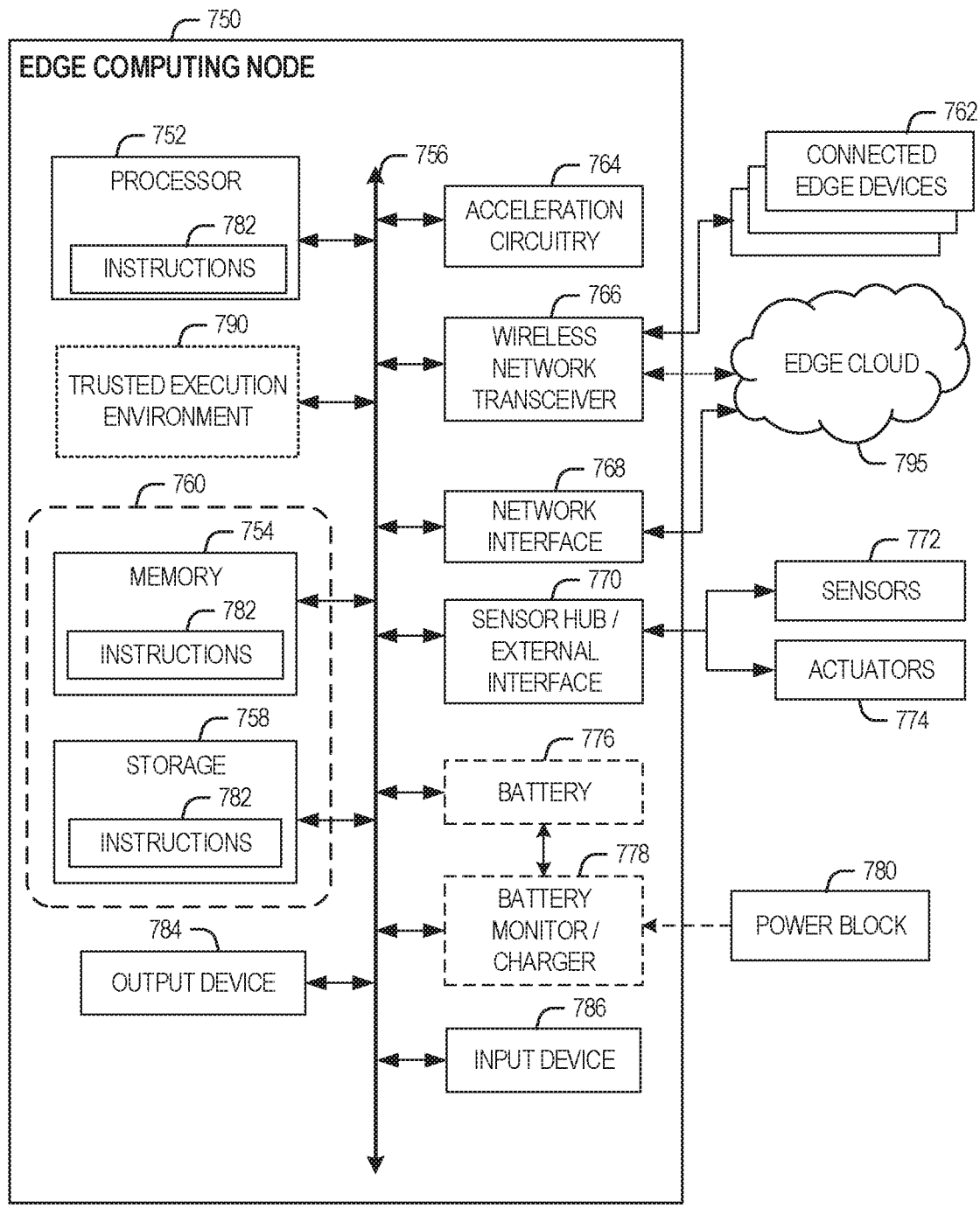
FIG. 7B provides a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing device 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, Calif. As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices. Inc. (AMD®) of Sunnyvale, Calif., a MIPS®-based design from MIPS Technologies. Inc. of Sunnyvale, Calif. an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766.768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Ariz. or an IC from the UCD90xxx family from Texas Instruments of Dallas, Tex. The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, Calif., among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 8:
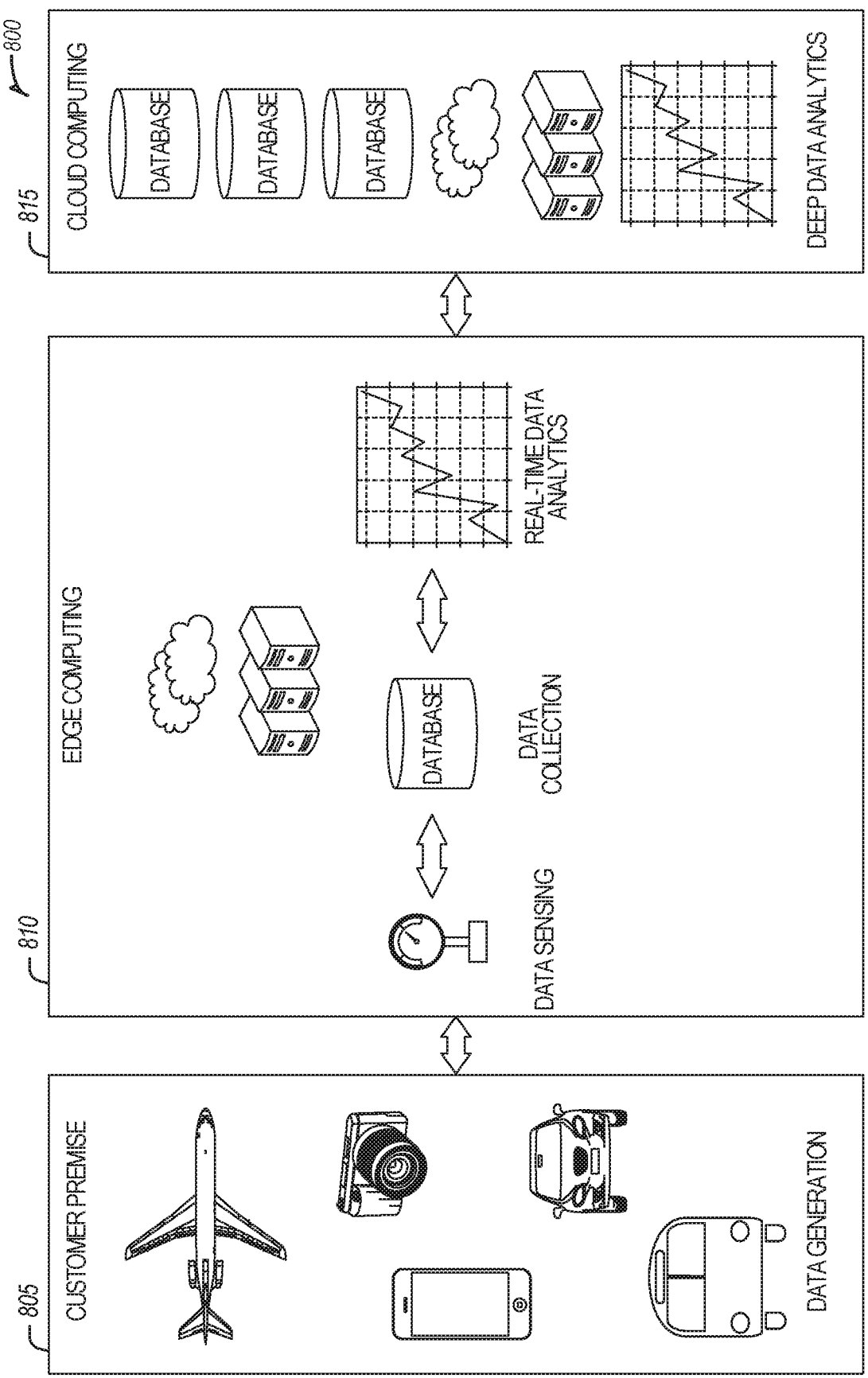
FIG. 8 is a block diagram of an example of an edge computing environment, according to an embodiment.

FIG. 8 is a block diagram of an example of an edge computing environment 800, according to an embodiment. In general, the middle "edge computing" tier is significantly limited in the resources of various kinds—processor cores, memory capacity, power, etc., yet, there is a need to ensure that important tasks receive the resources they require in order so that user experience is not affected by critical services getting slowed down due to insufficient resources. Providing the required resources in order also ensures stable user experience quality and that other engagement considerations (e.g., stable and predictable response times, etc.) are not violated.

The systems and techniques discussed herein address complexities that arise in multiplexing resources in an agile manner among different tasks (e.g., or as used interchangeably, requests, jobs, operations, etc.) in the edge tier. Tasks need resources in adequate measure so that they may complete within their deadlines (e.g., meet latency expectations, etc.) or at the scale that they need to execute (e.g., meet throughput targets, handle problems at the necessary scale without blowing up latencies, etc.). Thus, it is important to (1) assign resources in sufficient degree and (2) ensure that assigned resources become free again as quickly as possible so that they may become available for reuse to meet new demands.

Different computational resources become critical at different times because of variations in request patterns, resource usage ratios by different services in response to different requests, etc. It is therefore important to ensure that sufficient computational resources of different amounts are kept available so that they may be allocated to high priority requests (e.g., more critical, more sensitive, etc.) that cannot miss their deadlines. However, this often means that resources become fragmented by type and operation if rigid reservation or allocation schemes are employed.

Similarly, it is important to ensure that resources allocated at one time to an important task are recovered swiftly when that task completes so that they may remain available for other tasks that may arrive in the future. At the same time, taking back resources too quickly—for example, by taking away the resources from an operation as soon as a particular latency target is met—is also not advisable because it may mean that tasks that could complete and be terminated instead end up lingering too long and thus prevent some of the resources they hold from being released. For example, when a system is very heavily utilized, many low priority processes may be swapped out or be starved of CPU time-slices. The running status of many processes may show that many of the processes make forward progress very slowly. The overall processor utilization may go to non-productive activities like memory management and garbage collection due to processes faulting and losing what few pages they acquire. This may be due to excessive garbage collection.

A deserving task may qualify for a significant preference in obtaining the resources it needs at one time. However, if the task lingers too long and holds on to its resource allocation it deprives a system from assigning resources to other needs. A conventional admission control strategy that is employed to keep a system from becoming overloaded does not work very well in edge computing scenarios because of the unpredictable request arrival rate and a general expectation that edge computing activities are both interactive and need to perform deterministically. Thus, it is not acceptable to degrade content quality on a content delivery network (CDN) or degrade a sports viewing experience by terminating sessions just because of a transient spike in resource utilization.

Current solutions, focused mainly on data-center clouds or maximizing throughput under a max latency constraint tend to employ a mix of techniques: (a) hard partitioning-important applications are given a portion of resources and the rest are supported on a best-effort basis with the remaining resources; (b) overprovisioning or overdesigning-allowing priority applications to drive a machine up to some threshold utilization well below one hundred percent CPU, memory capacity or bandwidth, storage and network bandwidths, and so on, and then admitting other low-priority applications on a discretionary basis to utilize the remaining free (available) CPU, memory capacity or bandwidth, storage and network bandwidth and so on, so long as priority applications do not exceed their latency thresholds; and (c) static scheduling and load balancing-based on resource fingerprinting of workloads or similar bin-packing strategies.

Over-provisioning/over-designing raises costs and frequently leads to poor utilization. Current approaches are piecemeal, limited to per machine, and often per container, per micro-service, with little ability to (a) prioritize scheduling of resources at exactly the times and machines where speed or throughput may be most impacted and (b) achieve efficient use of resources at other times of low demand to support high priority work—for example, by performing more work that is not high priority. These issues exemplify both the cost from having to overdesign and the loss of opportunity for delivering more work without increasing cost. Further, even with over-provisioning it is not clear how solutions move with technology changes nor is it clear how to reassess which resources to redirect to new classes of needs or new opportunities that arise over time.

The systems and techniques discussed herein use a resource preservation approach that is short-term, dynamic, and adaptive to a determination that a given resource is becoming critical. The approach is soft which means that preserved resources are preferentially allocated to more important or urgent tasks but are not prevented entirely (i.e., are not sequestered) from being allocated for other purposes. The decision to allocate such a preserved but not sequestered critical resource R to non-priority purposes is shaped by at least two considerations: (1) the current available supply of the critical resource R and (2) the projected future supply of the critical resource R as a result of completions of tasks to which R has been currently allocated. A secondary consideration is to ensure that even though each such resource is critical, it is not reclaimed (that is, deallocated) from a task or a process too soon, because doing so may cause the task or process to be slowed down and therefore delay the release of other critical and non-critical resources—for example, reducing the number of CPU cycles may delay the completion or deactivation of a task or a process that occupies a large amount of memory or processor cache, and thus reduce the ability for other tasks or processes that face cache or memory capacity bottlenecks, to obtain cache or memory capacity that they need in sufficient measure to run efficiently.

Resource set-asides are used that are soft so that even non-critical requests may obtain resources identified for preservation based on estimated availability over time including the present time. The resources identified for soft preservation vary with dynamic conditions and they are set-aside in different amounts at different times based on those conditions.

Soft set-aside resources are awarded to non-critical requestors and are considered speculative and may be rescinded at any time. Thus, such non-critical tasks may be permitted to fail, take longer to complete, or deviate from a stable level of performance. Accordingly, speculative transactional operation is based on both current and future availability of resources, rather than only the current availability of resources.

Regardless of whether the set-asides are awarded at any time to critical or non-critical tasks, the awardees of these set-asides are assumed to be preemptable beyond a limited duration. Thus, set-aside amounts of resources do not become illiquid for an extended period of time and well-behaved tasks or processes (e.g., tasks or processes that return resources in a timely manner, etc.) are implicitly rewarded. In effect, the set-asides serve to improve determinism by acting as cushions for critical short-term needs-thus catering a backup "plan B" where a standard or normal "plan A" may be to assign resources on a reactive basis.

In an example, a hardware mechanism may automatically apply hardware tokens, credits. etc. to enforce secure and/or audited borrowing and returning of such set-aside resources. While the systems and techniques discussed herein are applicable to hardware and software implementations, hardware (including new-instructions) based allocation automata may provide additional benefits as hardware-based mechanisms may reduce software development and tuning burden, latency, and vulnerability to software faults and errors.

A framework for a distributed execution plan (DEP) and its attestation are used to create an opt-in framework that permits adaptive sharing of infrastructure through a collaborative prediction and enforcement scheme over resource allocation and recycling. Resource allocation control using such prescriptive means as resource manager identifier (RMID) based allocations of cache capacity, memory bandwidth, hardware-managed P-states (HWP) based processor power management, etc. and/or software prioritization mechanisms like CPU-shares and memory pinning and tier affinitization are used so that preservation and recycling of critical resources may be guided by policies and models that are used for workload orchestration.

With rising demand for edge computing, simplifying and automating resource allocation in edge infrastructure is important for achieving scaling of new services. Adapting to the shifts in resource hotspots helps improve cost efficiencies by ensuring that less critical requests do not impede more critical ones while also ensuring that available resources are not prevented from being maximally utilized.

The following adaptive, low-latency, approaches to edge resource management provides critical resources and completion times for priority tasks that are identified and the critical resources are soft-preserved proactively so that the likelihood of completing important work on time is maximized without fragmenting resources through use of hard quotas. It also provides for software-based guidance on execution planning so that resources may be allocated prudently and reclaimed efficiently and in a timely manner.

The systems and techniques discussed herein provide a number of features including:

Soft set-asides: Critical resources are soft-preserved proactively by setting aside a virtual quantum of a resource that is identified dynamically as critical. The set-asides do not prevent a preserved resource from being allocated. Rather, the allocation and freeing mechanisms collaborate to achieve a defined quantum of the resource being available.

Low latency: The decision system evolves continuously and the decisions it needs to make consist of a small number of comparisons unlike reactive systems that need to reassess and redo resource allocations when triggered.

Short-term preservation that is adaptive: In lieu of earmarking specific resources ahead of time for allocation to specific processes, the solution performs periodic, algorithm/model driven, determination of: (a) which resources are critical, for each priority/service-level agreement (SLA) application class, (b) what quantity of a critical resource should be preserved by using the soft set-asides, (c) what amount of the critical resource is likely to be available at a given future instant, or, at what future instant a given amount of critical resource is likely to be available, (d) which borrowers of the resource may obtain the resource speculatively (e.g., under the proviso that they can be forced to release the resource at any time) (e) when to trigger release of a critical resource from speculative usages.

Task/request/operation categories: Tasks, requests, etc. are grouped into two broad category sets: a first group includes those that may be given a non-default priority level in receiving the resources they need and a second group is accorded a non-priority or "best-effort" treatment. Each of these groups may consist of subgroups. Members of the first group are required to be compliant with a "well-behavedness requirement" (e.g., tractable) in exchange for receiving priority treatment. Tractable means that the work item either completes quickly or releases the resources borrowed within a predictable amount of time. Thus, tractable applications may readily borrow what they need as long as the needed resources are available because the return of resources is predictable. Even so, tractable applications may be preempted and forced to release resources if they have borrowed critical resources well above their configured watermarks and failed to release the excess in a reasonable amount of time. Best effort borrowers may be preempted more liberally when the resources they borrow drop in availability below configured resource watermarks.

Coordinated execution planning: Execution meta-programs called Distributed Execution Plans (DEPs) are used to capture and express resource usage timelines. Prediction models are used with the DEPs to determine when resources are likely to be released over time. This provides for proactive scheduling of current requests waiting to be assigned resources in sufficient degree. It also permits best-effort requests to obtain resources speculatively and the best effort requestors to be identified for preemption when they have gone well past their predicted milestones for completing and releasing resources.

Secure or trusted guidance on execution planning: The DEPs are associated with attestations particularly when DEPs are supplied from elsewhere (e.g., from application providers, service deployers, etc.).

Figure 9:
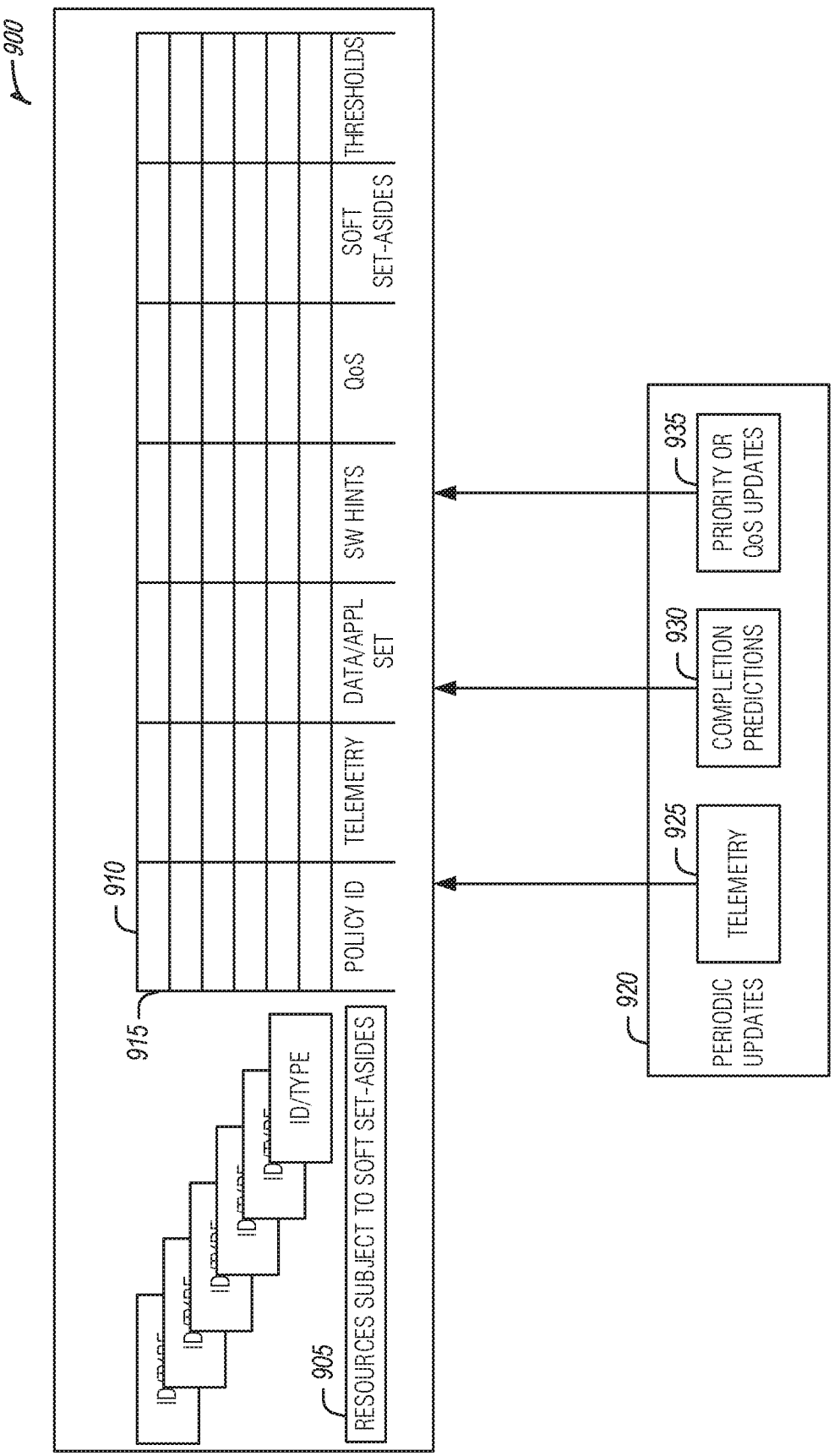
FIG. 9 illustrates a block diagram of an example of a dataset for calculating and enforcing resource soft set-asides for adaptive limited-duration edge resource management, according to an embodiment.

FIG. 9 illustrates a block diagram of an example of a dataset 900 for calculating and enforcing resource soft set-asides for adaptive limited-duration edge resource management, according to an embodiment. The dataset 900 shows, by way of example and not limitation, some of the various considerations that may get factored into such decisions. It will be understood that many other considerations may be factored into soft set-aside decisions. Each column 910 in the dataset 900 represents a factor applicable to the provisioning of a resource and each row 915 in the dataset 900 represents values for the factors for a different hardware or software resource 905. For example, a resource 905 such as memory bandwidth or processor power may be governed by a policy identified in the policy column 910 with an identifier. If no policy has been specified for a given resource, a default policy that is defined by an operating system/runtime may apply.

The policy that is operative for a given resource 905 may be parameterized by different settings and dynamic conditions which may be reflected by values (e.g., scalar, vector, matrix, categorical values, etc.) that are reflected in the columns 910 of the dataset 900. These columns 910 may include: telemetry information concerning the resource 905 utilization and demand, the dataset or an application-set identity for which priority and/or quality of service (QoS) settings may be specified against that resource 905, various software provided hints or directives concerning the priority of the dataset/application-set, any QoS settings that may be similarly specified for that resource 905 on behalf of the application, etc.

A model or an algorithm may produce an indication of a soft set-aside for each resource that satisfies the various policy. QoS, and priority settings described for a given resource 905. For example, this may be a best-fit solution across diverse requirements. Given a particular determination of a short-term soft set-aside, a threshold values column may also be configured or dynamically computed.

When an available quantity of a given resource 905 meets or exceeds the threshold value, even non-critical tasks or applications may be able to request and receive a resource 905 that is subject to allocation control. Thus, the resource 905 (e.g., memory bandwidth, etc.) does not have to be sequestered until its availability has dropped below the threshold. Further, mechanisms are used to estimate a rate of release of resources. Therefore, the amount of a given resource 905 that will be available in a forward time interval may be projected. If the projected available amount exceeds a threshold value, then a non-critical requestor may be permitted to allocate a defined amount D of the resource R even if the currently available amount A of R is insufficient to cover the soft short-term set-aside S after providing the defined amount—that is, when a projected future available amount is above a threshold, the non-critical requestor may be permitted to allocate amount D of R if D is not larger than A (what is available), even if what would immediately remain, i.e., (A-D) is below the amount S that is to be soft-preserved A distributed execution plan (DEP) provides a means for estimating the completion times of various requests or operations in progress. Periodically, the information in the dataset 900 is updated 920 with telemetry 925, completion time predictions 930 from DEP (which also yields predictions about resources to be released over time), and any updates to priorities and/or quality of service settings 935 for various applications, services, or tasks.

Figure 10:
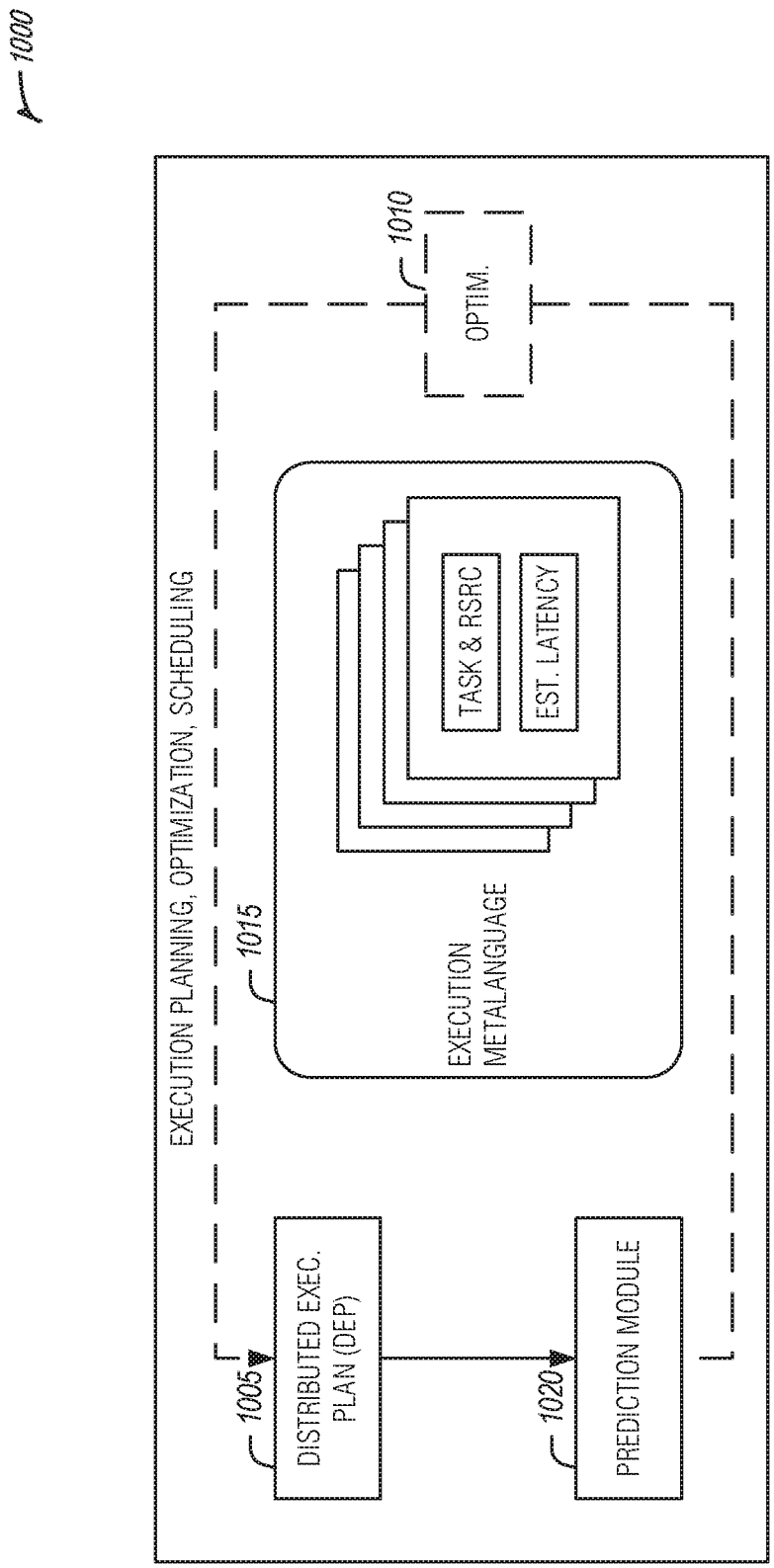
FIG. 10 illustrates a block diagram of an example of execution planning and optimization driven by a distributed execution plan (DEP) and prediction of completion for adaptive limited-duration edge resource management, according to an embodiment.

FIG. 10 illustrates a block diagram of an example of an execution planning and optimization process 1000 driven by a distributed execution plan (DEP) 1005 and prediction of completion for adaptive limited-duration edge resource management by a prediction module 1020, according to an embodiment. Resource allocation and resource eviction thrashing may happen if it is not clear for how long resources currently allocated might be used. In an example, the DEP may be designed, implemented, or coordinated by an orchestrator or meta-orchestrator in the edge computing system.

To avoid thrashing, a prediction of how much time is needed to complete either on-going or newly arriving tasks is calculated. The DEP 1005 is used to facilitate the prediction 1020. The DEP may be expressed in a meta-language 1015 or an interpreted language and it may express a workload's decomposition into various subtasks and their execution orders and resource requirements. The principal contributors that affect latencies are captured and expressed in the meta-language 1015 of the DEP 1005 and a DEP 1005 may be evaluated with available telemetry information to predict or compute an estimate for the time it would take to complete a task or to have it reach a point where it can be deactivated for releasing the resources that are assigned to the task. For example, a scheduling item (e.g., task_X@FaaS_Y-with-Rsrc_Z) would support a latency sub-type for each expression element (e.g., Type: Task=Name:string, Format:COFF, Size:bytes. Latency: Ticks, etc.).

Latency subtype expressed in the meta-language 1015 captures the time needed to execute a task. Similarly, a networking context structure might have a latency sub-type for network response time latency, etc. The DEP 1005 incorporates the various expected latencies into the planning estimate and may iterate to optimize 1010 various trade-offs. Thus, the DEP 1005 creates the expectation that resources are used in a predictable way even if they are not statically allocated at the time a function or a task is scheduled.

Tasks that may be urgent or necessary to be scheduled in the future and the resources that are likely to be critically needed may be identified from the DEP 1005. Accordingly, the DEP 1005 may factor in demand for resources that are critical for tasks. In an example, the DEP 1005 may use a token/credits-based operation flow to inhibit system oscillation (e.g., by preventing resources from being treated as not-critical, to being treated as critical, and going back to being treated as non-critical almost instantly). Oscillation may be otherwise produced by an external attacker that provides requests (e.g., as stimulus inputs) to the system. Thus, the DEP may be tied to an attestation-based token flow management to prevent an attacker from triggering system oscillation.

Figure 11:
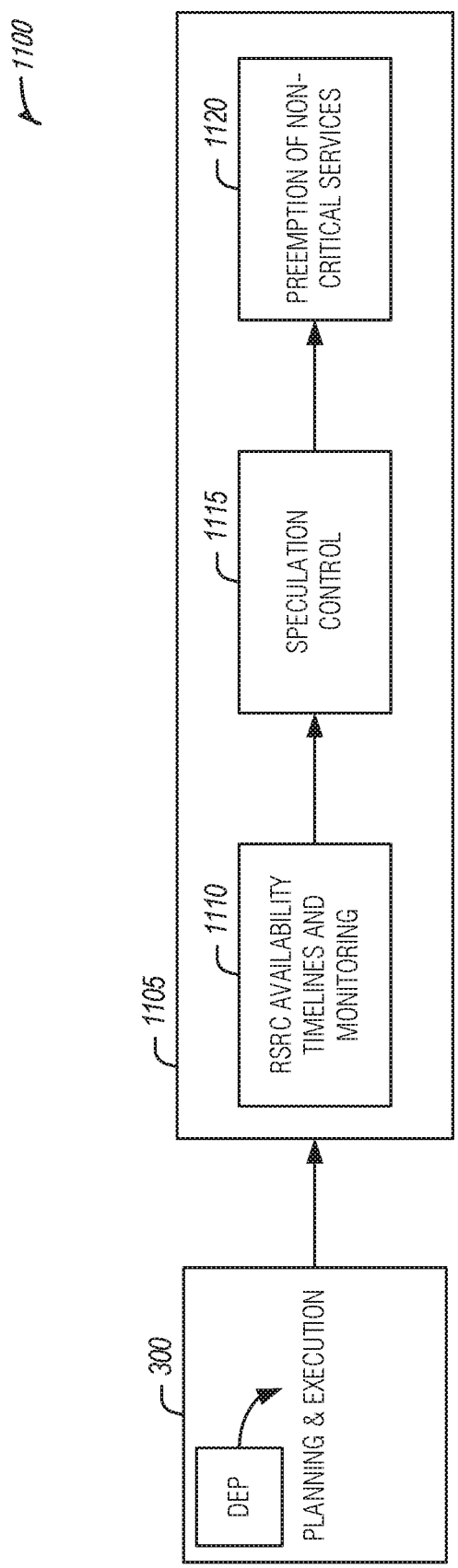
FIG. 11 illustrates an example of DEP base planning and execution and resource availability maintenance for adaptive limited-duration edge resource management, according to an embodiment.

FIG. 11 illustrates an example of DEP based planning and execution 1000 and resource availability maintenance 1100 for adaptive limited-duration edge resource management, according to an embodiment. FIG. 11 depicts one aspect of planning and maintaining resource availability functions over time. Using the DEPs, scheduling systems may plan and execute request servicing tasks which cause resources to be allocated and consumed, as shown in block 1000. Block 1105 includes generation of telemetry from monitoring at block 1110 combined with model driven predictions of resource availabilities over time that are determined from the DEPs at block 1115. As resource availabilities predicted from block 1105 fall below configured thresholds, speculation control is triggered in block 1115 which causes non-priority or best-effort tasks that have received critical resources to be preempted in block 1120. Included in resource availability control is preemption of well-behaved services or tasks that are failing to demonstrate tractable behavior (e.g., services that are declared or specified to be well-behaved, yet fail to be well-behaved—typically because of an outlier condition, and therefore need to be preempted, aborted, restarted, etc.), however this is not explicitly depicted in 1105 as this is an exceptional circumstance and therefore non-typical.

Figure 12:
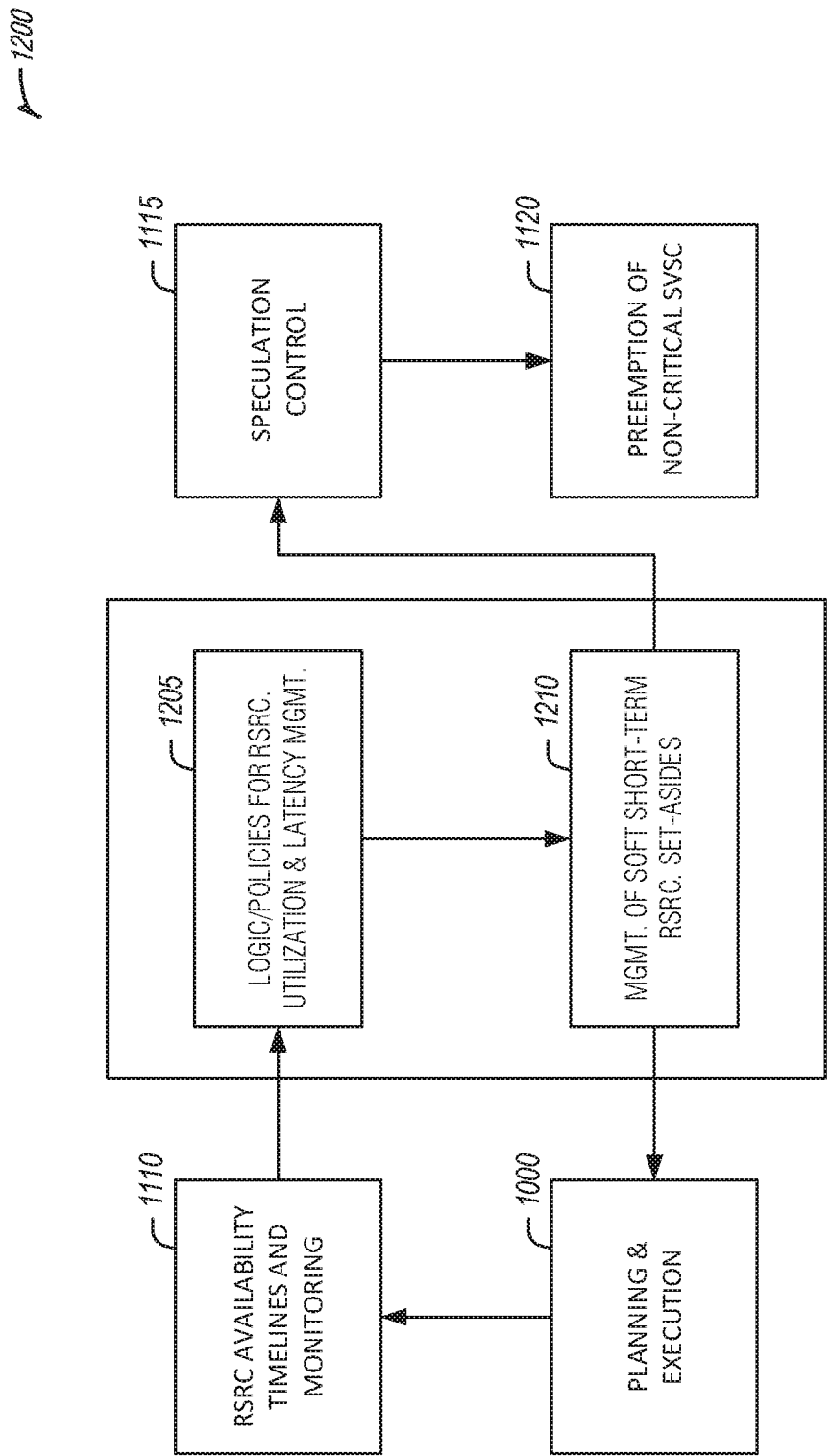
FIG. 12 illustrates an example of a process for management of soft set-asides and scheduling of resource consumers for adaptive limited-duration edge resource management, according to an embodiment.

FIG. 12 illustrates an example of a process 1200 for management of soft set-asides and scheduling of resource consumers for adaptive limited-duration edge resource management, according to an embodiment. The process 1200 depicts the flow of FIG. 11 augmented with intermediary mechanisms that produce feedback for planning and execution. Resource availability timelines estimated in block 1110 activate configured logic or policies for maintaining latency thresholds (e.g., for ensuring that critical tasks do not miss their resource needs and that they get scheduled in time) as shown in block 1205. Based on the execution of the logic in block 1205, block 1210 computes the short term critical resource set-asides that are needed for each consumer task or service that falls into the first priority group, and/or to trigger dispatches of the tasks that are in the first priority group in block 1000, or to cause speculation control to be activated in block 1115 so that critical resources may be replenished by limiting some tasks in the second group, and may be increased by preempting other non-priority tasks in block 1120.

The latency management policies or logic in block 1205 may raise short-term priority or QoS expectations for tasks in the first group. As deadlines approach, their eligibility for receiving the resources they (the tasks in the first group) need is increased. In addition to increasing the eligibility for critical resources, the short-term soft set-asides for the critical resources are also increased. These updates to task priorities and resource soft set-asides may be computed in-band in a scheduler loop that iterates over all tasks or may be updated out-of-band by timers or by other administrative utilities that perform monitoring and enforcement of quality of service metrics. It is also possible that instead of these task priorities and resource soft set-asides being explicitly computed (in-band or out-of-band), they may be estimated from moving averages over proxy indicators drawn from services telemetry. Proxy indicators may be, for example, metrics such as instructions-retired, messages sent, storage IOs performed, packets dropped, median instructions-per-cycle ratios, etc.

Figure 13:
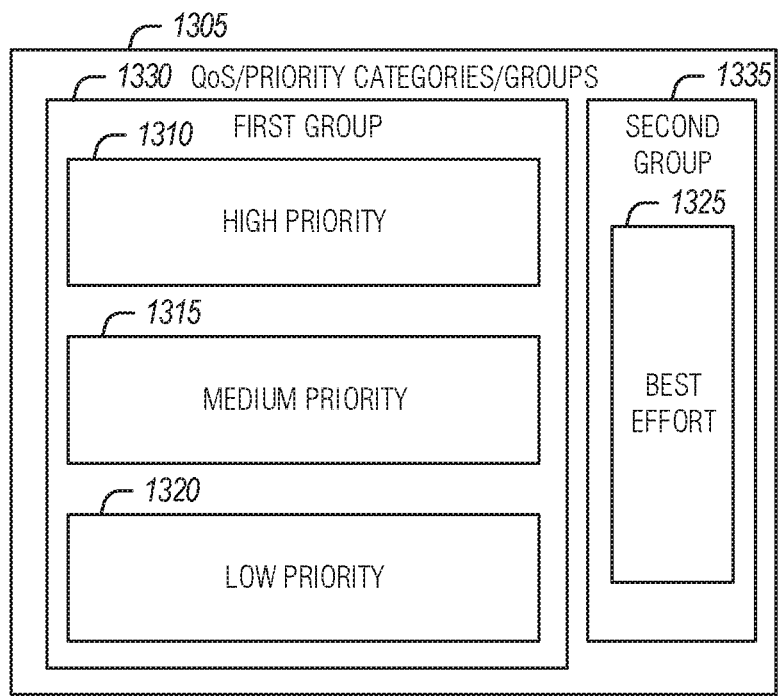
FIG. 13 illustrates an example of task groups for adaptive limited-duration edge resource management, according to an embodiment.

FIG. 13 illustrates an example of task groups 1305 for adaptive limited-duration edge resource management, according to an embodiment. FIG. 13 illustrates two groups of tasks. A first group 1330 includes high priority tasks 1310, medium priority tasks 1315, and low priority tasks 1320. A second group 1335 includes best-effort or default priority tasks 1325. In general, there may be any number of priority classes for the first group 1330.

Figure 14:
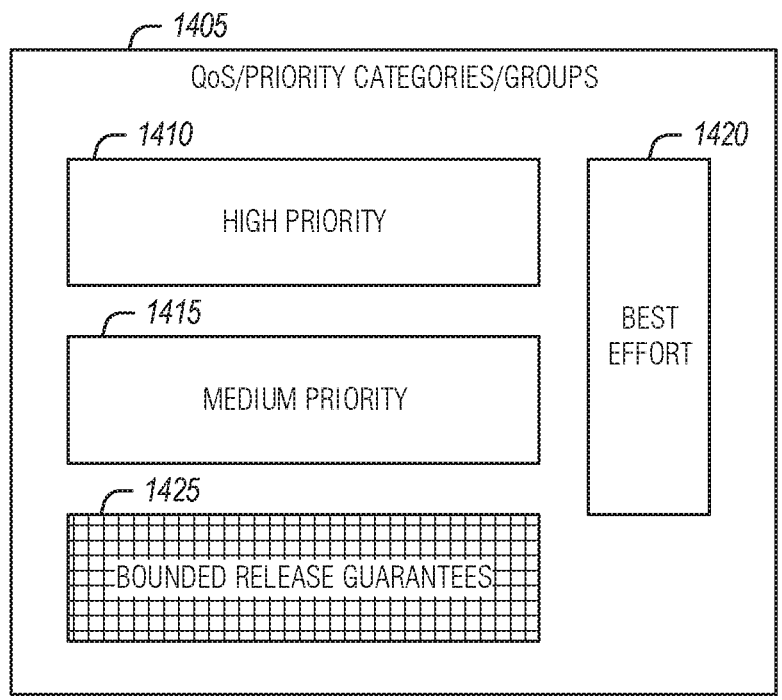
FIG. 14 illustrates an example of task groups and bounded release guarantees for adaptive limited-duration edge resource management, according to an embodiment.

FIG. 14 illustrates an example of task groups and bounded release guarantees 1405 for adaptive limited-duration edge resource management, according to an embodiment. FIG. 14 illustrates a first group that includes a high priority class 1410 and a medium priority class 1415. Jobs that do not fit into the high priority class 1410 or the medium priority class 1415 are collapsed into a best-effort class 1420 of a second group. In an example grouping, administrative utilities may be used to attest that a task that is not specified with a particular priority class is well-behaved (e.g., reserves and releases resources in a timely manner, etc.), may be accordingly associated with bounded release guarantees 1425, and assigned variable priority at run time based on other tasks that may depend upon its timely completion and release of resources.

Figure 15:
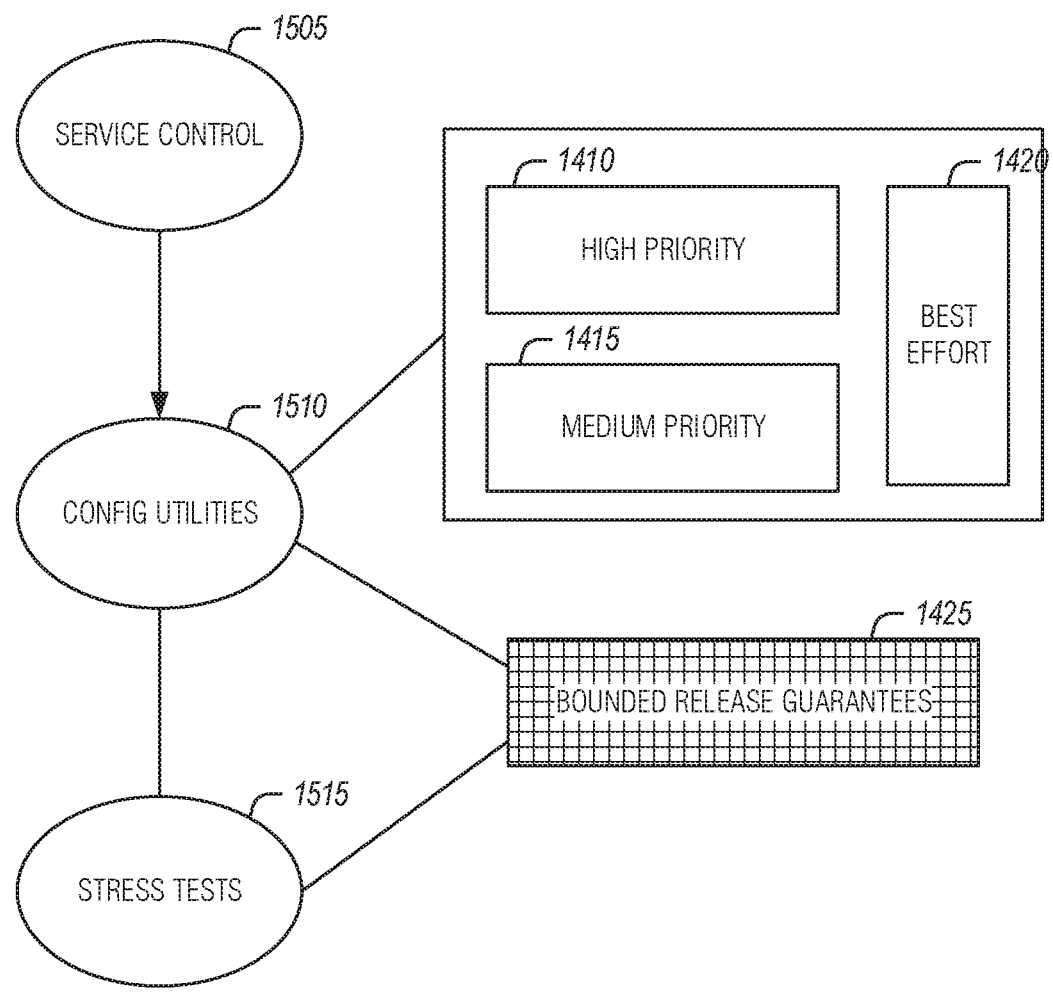
FIG. 15 illustrates an example of a system architecture for specifying, managing, and qualifying workloads for adaptive limited-duration edge resource management, according to an embodiment.

FIG. 14 illustrates that the high priority class 1410 and the medium priority class 1415 satisfy various bounded release guarantees 1425 on resources allocated to the classes. In addition, other low priority but non best-effort tasks 1320 may also be identified by administrative utilities as satisfying the various bounded release guarantees 1425. The bounded release guarantees 1425 are represented as a table with columns for each resource and different lengths of time beyond which an application may release resources. A bounded release guaranteeing application may continue to function without errors when assigned a minimum volume of its critical resources, where the bounded volume is lower than an optimal volume of the critical resources. However, the application may function at a lower performance level (e.g., higher latency, etc.) when provided with only the minimum volume of critical resources needed for error-free operation FIG. 15 illustrates an example of a system architecture 1500 for specifying, managing, and qualifying workloads for adaptive limited-duration edge resource management, according to an embodiment. A service control framework 1505 employs configuration utilities 1510 for declaring applications as well-behaved or default. For the well-behaved workloads their bounded release guarantees 1425 are specified by the configuration utilities 1510. A set of stress tests 1515 may be used to exercise the hardware and platform software infrastructure under a variety of different configurations to confirm that the applications satisfy the bounded release commitments.

Further, the categorization may be dynamic and automated. For example, a consumer of a given service may raise or lower category prioritization by setting various preferences (e.g., agreeing to pay more for a higher category, intentionally deprioritizing themselves in order to save money, etc.). Categorization may also be dynamically shaped by a dependency graph. For example, when the execution of a high priority task or service is dependent on another service whose priority is undetermined, the other service may be assigned a high priority by policy.

Figure 16:
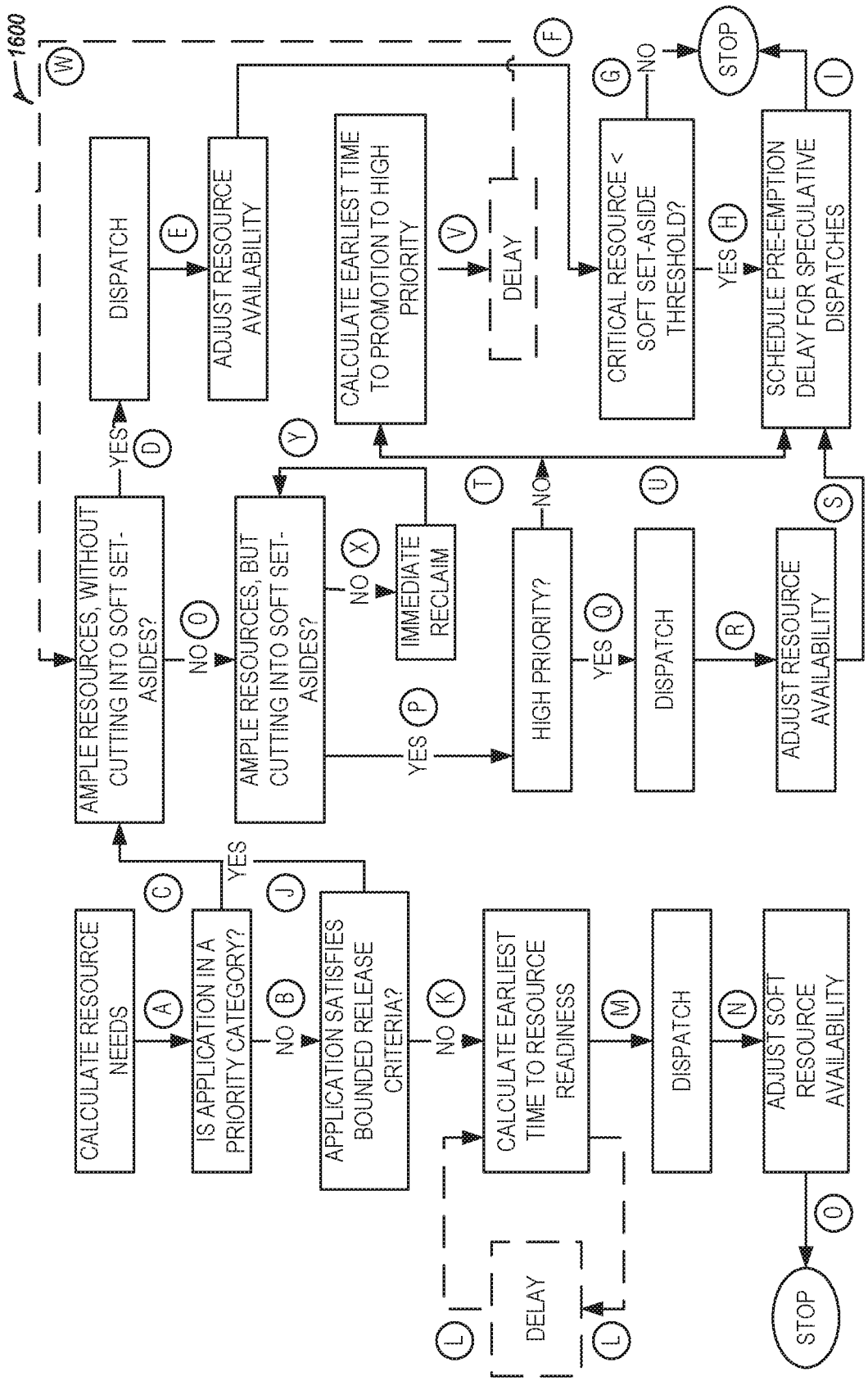
FIG. 16 illustrates an example of a process for adaptive limited-duration edge resource management, according to an embodiment.

FIG. 16 illustrates an example of a process 1600 for adaptive limited-duration edge resource management, according to an embodiment.

Along paths A-C-D and A-B-J-D, a task that needs resources is either a priority task or a tractable task (e.g., a well-behaved task) and the available resources are in sufficient supply. Thus, the task is dispatched.

Upon dispatching the task, resource availability projections are updated. Along path E-F-G, it is determined that the resource availability projections do not indicate a negative impact on critical resource set-asides and the process 1600 ends.

Along path E-F-H, it is determined that the resource availability projections indicate a negative impact to the critical resource set-asides. A preemption-delay parameter (which specifies or which may be used to compute the length of time for which a task may execute before it is preempted) is adjusted, so that best effort tasks that are in progress may be preempted sooner for the purpose of securing releases of the resources they are assigned. The process 1600 then ends.

Along paths A-B-J-O-P-Q-R-S-I and A-C-O-P-Q-R-S-I, a priority task or a tractable (i.e. well-behaved) task requests resources and it is determined that there is an adequate supply of resources available. However, it is determined that servicing the request will reduce the soft set-aside supply to below a desired threshold. If the task has a sufficiently high priority it is entitled to receive the set-aside resources and the task is dispatched.

After dispatching the task and adjusting the resource supply, it is known that dispatching the task causes a negative impact on maintaining the soft set-aside supply at the desired threshold level. A preemption-delay parameter (which specifies or which may be used to compute the length of time for which a task may execute before it is preempted) is adjusted, so that best effort tasks that are in progress may be preempted sooner for the purpose of securing releases of the resources they are assigned. The process 1600 then ends.

Along paths A-J-O-P-T and A-B-C-O-P-T, a priority task or a tractable task requests resources and it is determined that there is an available supply of resources. However, the task does not have sufficient priority to be automatically entitled to a set-aside amount. Therefore, along path T-v-W-O-P, the task is delayed until it receives priority promotion (for example, so that it may meet a deadline) according to configured policies 1205. Simultaneously, along paths A-J-O-P-U-I and A-B-C-O-P-U-I, a preemption-delay parameter (which specifies or which may be used to compute the length of time for which a task may execute before it is preempted) is adjusted, so that best effort tasks that are in progress may be preempted sooner for the purpose of securing releases of the resources they are assigned. The process 1600 then ends.

Along paths A-B-J-O-X-Y and A-C-O-X-Y, a priority task or a tractable task requests resources and it is determined that there is not a sufficient supply of resources available to allow the task to proceed. Therefore, an immediate reclaim (e.g., a preemption without a delay) of best-effort tasks is undertaken until sufficient resources become available.

Along path A-B-K-[L]*-M-N-O, a low-priority or otherwise non-tractable (i.e., not guaranteed to be well-behaved), best-effort task requests resources and the best effort task is allowed to proceed based on an evaluation of whether sufficient resources will be available over a duration forward from launch of the task so that the task may complete without having to be preempted. If at the current time, there is either ample supply or there is estimated to be ample resource release occurring in short term, then the best effort task is permitted to proceed. Otherwise, the task may be delayed (e.g., along a delay loop [1]*) until that resources or projected resources are available. When it has been determined that the best effort task may proceed, it is dispatched. Resource availability statistics are adjusted and the process 1600 ends. After the task has been dispatched, it is possible that it may be preempted based on evolving resource availability conditions.

In an example, automated (e.g., formula based, etc.) priority increments may be a function of (w/r, q), where q is a level of priority increase needed in order to qualify for dispatch, w is a length of time the task stalls due to insufficient priority to allocate from the soft-set-asides, and r is a desired response time. Thus, the longer a task waits in relation to its response time threshold, the faster it moves towards closing the gap between its current priority and the priority level it needs to be at in order to be allocated resources from a preserved resource quota. Automation provides self-promotion for well-behaved tasks and reduces latency of the task.

In an example, multi-tiered or nested service level agreements (SLAs) may be implemented to manage resource allocation when the overall short-term demand for resources from priority tasks or well-behaved tasks rises to different thresholds of utilization. Under a multi-tiered SLA, a first SLA that is violated causes a second SLA that is less stringent than the first SLA to be activated, with a first upper bound on the total number of violations of the first SLA. Similarly, a first SLA and a second SLA that are violated may cause a third SLA that is less stringent than the second SLA to be activated with a second upper bound on the total number of violations of the first SLA and the second SLA. This does not prevent violations of a first (e.g., principal, etc.) SLA but controls the severity of the violations as codified into a secondary SLA, and so on.

In an example, high priority tasks may be permitted to pre-reserve a small amount of soft set-aside for any given resource they may identify through configuration utilities. The high priority task may claim the soft set-aside only when resource availability falls below a threshold for a defined period of time. Thus, until resources reach a critical low-level, the soft set-aside may be provided to lower priority tasks. After that threshold is triggered, allocation is biased towards high priority tasks.

Figure 17:
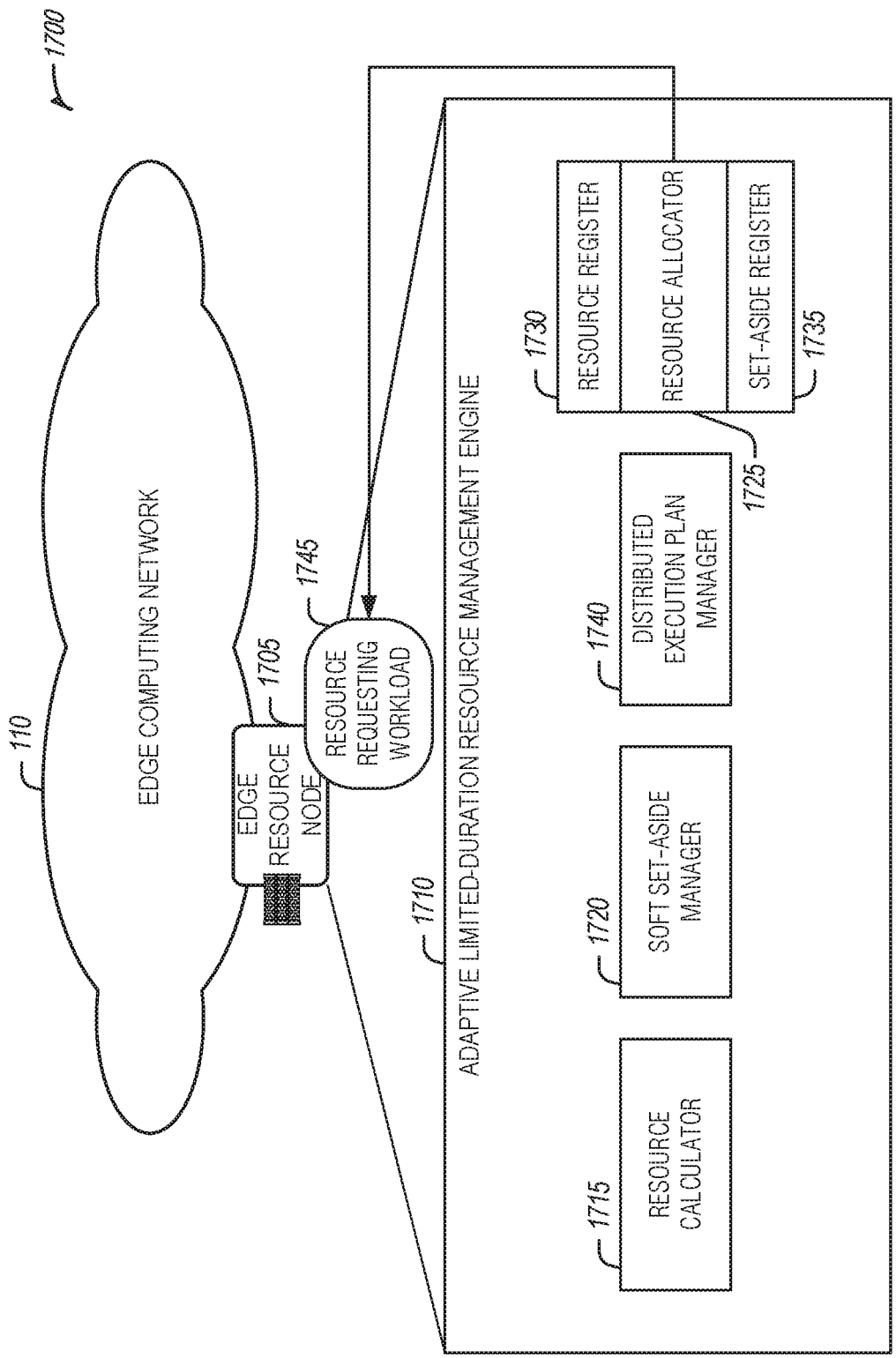
FIG. 17 illustrates an example of a system for adaptive limited-duration edge resource management, according to an embodiment.

FIG. 17 illustrates an example of a system 1700 for adaptive limited-duration edge resource management, according to an embodiment. The system 1700 may provide features as described in FIGS. 1-16.

The system 1700 may include an edge resource node 1705 (e.g., edge resource nodes 640 as described in FIG. 6, compute node 700 as described in FIG. 7A, edge computing node 750 as described in FIG. 7B, etc.) that is a member of an edge computing network 110. The edge resource node 1705 may include an adaptive limited-duration resource management engine 1710 for managing resource allocation to a resource requesting workload 1745. The resource requesting workload 1745 may be a workload for an application/service executing on the edge resource node 1705.

The adaptive limited-duration resource management engine 1710 may include a variety of components including a resource calculator 1715, a soft set-aside manager, a resource allocator 1725, a resource register 1730, a set-aside register 1735, and a distributed execution plan manager 1740. There may be an Attestation/Trust manager in the adaptive limited-duration resource management engine 1710 that evaluates the security risk or business risk assessed via Attestation of input data. For example, the resource calculator 1715 may operate on telemetry data that is input to the resource calculator 1715. A trust factor (probability) may be tagged to each input whether telemetry. QoS, software, hardware or other 'data'. The risk factor may be applied by the resource allocator 1725 to evaluate a probability that a resource allocation decision should be made (finalized). For example, if there is high probability that telemetry input data is falsified, the resource allocator 1725 may determine that a high-value resource not be allocated unless there is also high-probability that the resource calculator 1715 (and other managers') decisions have high integrity.

The resource calculator 1715 may evaluate telemetry data, quality of service data, software data, hardware data, workload data. etc. to calculate available capacity for a resource for the edge resource node 1705. For example, telemetry data for currently executing and predicted workloads may be evaluated to calculate the available capacity for a time period. In another example, workload telemetry data may be evaluated using a machine learning model or algorithm to calculate resources available for the time period. In an example, a machine learning model may incorporate a trust factor in its training so that high quality and high trust are (or are not) relevant decision criteria.

The soft set-aside manager 1720 may determine available set-aside resources based on the available capacity. In an example, the available set-aside resources designate resources of the node to be assigned to a workload for a limited duration of time. For example, a portion of the available resources may be set-aside for usage by critical and non-critical workload and associated tasks that are determined to be tractable. In an example, telemetry data may be collected from the node. The telemetry data may be evaluated to estimate resource usage of workloads executing on the node and the available set-aside resources may be determined in part using the estimated resource usage. In another example, quality of service metrics may be identified for the resource and the available set-aside resources may be determined in part using the quality of service metrics.

In an example, a future resource availability value may be predicted for the node for a future time period and the set-aside resources may be determined based in part on the future resource availability value. The workload and associated tasks may be identified as tractable based on attestation of their tractable nature, based on evaluation of the workload and associated tasks using machine learning models or algorithms to predict their tractability.

The distributed execution plan manager 1740 may generate distributed execution plans for the edge resource node 1705. In an example, execution parameters of workload tasks executing on the node may be identified. A distributed execution plan may be generated for the node using the execution parameters and the future resource availability may be predicted using the distributed execution plan. In an example, the distributed execution plan may be expressed in meta-language or an interpreted language. In an example, the distributed execution plan may assign tokens or credits to the tasks to prevent priority category variation (e.g., oscillation, etc.). Addition details of the DEP are discussed in FIG. 10.

A service request may be received from an application/service executing on the edge resource node 1705. For example, a client device, peer, service, etc. may initiate an action with the application and, in return, the application may initiate a service request to obtain resources from the edge resource node 1705. The service request may include the resource requesting workload 1745. The service/application may initiate the resource requesting workload 1745. The resource allocator 1725 may receive the resource request from the resource requesting workload 1745. For example, an application executing on a smartwatch may request composed data from a service and a data server application on the edge resource node 1705 may run and initiate the service requesting workload 1745 at the edge resource node 1705. The service request may include data that may be used to identify resources needed to execute the workload to return the composed data. The resource allocator 1725 may determine a priority category for the service request. For example, the request may be high priority, medium priority, best effort priority, etc.

The resource allocator 1725 may assign set-aside resources from the available set-aside resources for a limited duration of time to a workload associated with the service request based on the priority category. For example, the request for composed data may be assigned resources on a best effort basis which may have an impact on thresholds for reclaiming resources. In an example, it may be determined that resources of the node are outside a resource capacity threshold and the set-aside resources may be reclaimed from the workload. In another example, it may be determined that the workload does not meet bounded release criteria. A resource release time may be set for the workload and the set-aside resources may be reclaimed upon expiration of the resource release time.

In an example, a preemption-delay may be assigned to the set-aside resources assigned to the workload. A second service request may be received with a higher priority category. For example, while the composed data workload is being executed, a request for an emergency medical services workload may be received that has a high priority. The set-aside resources may be reclaimed from the workload and the set-aside resources may be assigned to a second workload associated with the second service request.

In an example, a resource preemption schedule may be set for the set-aside resources assigned to the workload based on the priority category. It may be determined that the priority category of the workload has changed and the resource preemption schedule may be adjusted. The set-aside register 1735 tracks set-aside usage so that the resource allocator 1725 may quickly determine set-aside resources that are available for allocation. In an example, the set-aside resource availability register 1735 may be maintained for the set-aside resources and the set-aside resource availability register 1735 may be adjusted based on the set-aside resources assigned to the workload.

The resource register 1730 may track resources available at the edge resource node 1705. The resource allocator 1725 may periodically reference the resource register 1730 to determine resource capacity of the edge resource node 1705 so that soft set-asides may be released. In an example, it may be determined that there are sufficient resources available at the node. Resources may be assigned to the workload from available resources of the node. The set-aside resources assigned to the workload may be reclaimed and the set-aside resource register 1735 may be adjusted based on the set-aside resources reclaimed from the workload.

The present subject matter may be implemented in various configurations. For example, the resource calculator 1715, the soft set-aside manager, the resource allocator 1725, the resource register 1730, the set-aside register 1735, and the distributed execution plan manager 1740 may be implemented in different (or the same) computing systems (e.g., a single server, a collection of servers, a cloud-based computing platform, etc.). A computing system may comprise one or more processors that execute software instructions, such as those used to define a software or computer program, stored in a computer-readable storage medium such as a memory device. Alternatively or additionally, the computing system may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Figure 18:
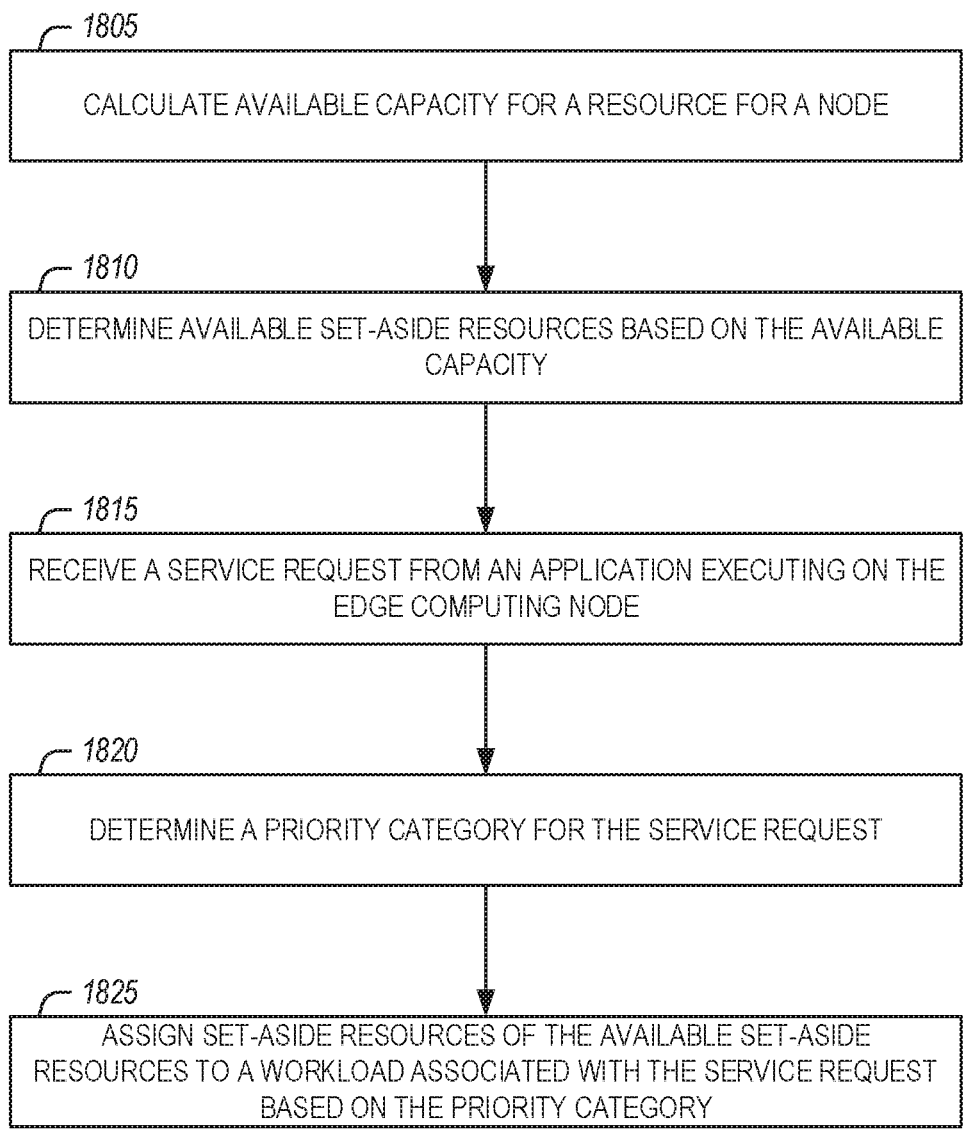
FIG. 18 illustrates a flow diagram of an example method for adaptive limited-duration edge resource management, according to an embodiment.

FIG. 18 illustrates a flow diagram of an example method 1800 for adaptive limited-duration edge resource management, according to an embodiment. The method 1800 may provide features as described in FIGS. 1-16.

At operation 1805, available capacity may be calculated for a resource for a node of the edge computing network based on workloads executing on the node. At operation 1810, available set-aside resources may be determined based on the available capacity. In an example, telemetry data may be collected from the node. The telemetry data may be evaluated to estimate resource usage of workloads executing on the node and the available set-aside resources may be determined in part using the estimated resource usage. In another example, quality of service metrics may be identified for the resource and the available set-aside resources may be determined in part using the quality of service metrics.

In an example, a future resource availability value may be predicted for the node for a future time period and the set-aside resources may be determined based in part on the future resource availability value. In an example, execution parameters of workload tasks executing on the node may be identified. A distributed execution plan may be generated for a plurality of workload tasks that are run or executed at the node using the execution parameters and the future resource availability may be predicted using the distributed execution plan. In an example, the distributed execution plan may be expressed in meta-language or an interpreted language. In an example, the distributed execution plan may assign tokens or credits to the tasks to prevent priority category variation.

At operation 1815, an application service request may be received from an application executing on the edge computing node. At operation 1820, a priority category may be determined for the received application service request, determined at least in part, on a priority associated with the sender of the application service request. At operation 1825, set-aside resources from the available set-aside resources may be assigned to a workload associated with the application service request for a limited duration of time based on the priority category. In an example, it may be determined that contemporaneously available resources of the node are below a resource capacity threshold and the set-aside resources may be reclaimed from the workload. In another example, it may be determined that the workload does not meet bounded release criteria. A resource release time may be set or adjusted from a previously set value for the workload and the identified amount of set-aside resources may be reclaimed from the workload upon expiration of the resource release time.

In an example, a preemption-delay may be assigned to the set-aside resources assigned to the workload. A second service request may be received with a higher priority category. The set-aside resources may be reclaimed from the workload and the set-aside resources may be assigned to a second workload associated with the second service request.

In an example, a resource preemption schedule may be set for the set-aside resources assigned to the workload based on the priority category. It may be determined that the priority category of the workload has changed and the resource preemption schedule may be adjusted. In an example, a set-aside resource availability register may be maintained for the set-aside resources and the set-aside resource availability register may be adjusted based on the set-aside resources assigned to the workload. In an example, it may be determined that there are sufficient resources available at the node. Resources may be assigned to the workload from available resources of the node. The set-aside resources assigned to the workload may be reclaimed and the set-aside resource availability register may be adjusted based on the set-aside resources reclaimed from the workload.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Additional Notes & Examples

Example 1 is a system for limited duration resource allocation in an edge computing network comprising: at least one processor; and memory including instructions that, when executed by the at least one processor, cause the at least one processor to perform operations to: calculate available capacity for resources of a node of the edge computing network based on workloads executing on the node; determine available set-aside resources of the node based on the available capacity, wherein the available set-aside resources designate resources of the node to be assigned to a workload for a limited duration of time; receive a service request from an application executing on the edge computing node; determine a priority category for the service request; and assign, for a limited duration of time, a set-aside resource from the available set-aside resources of the node to a workload associated with the service request based on the priority category.

In Example 2, the subject matter of Example 1 includes, the memory further comprising instructions that cause the at least one processor to perform operations to: determine that utilized resources of the node are outside a resource capacity threshold; and reclaim the set-aside resources from the workload.

In Example 3, the subject matter of Examples 1-2 includes, wherein the priority category is best effort and the memory further comprising instructions that cause the at least one processor to perform operations to: assign a preemption delay to the set-aside resources assigned to the workload; receive a second service request with a higher priority category; reclaim the set-aside resources from the workload; and reassign the set-aside resources to a second workload associated with the second service request.

In Example 4, the subject matter of Examples 1-3 includes, the memory further comprising instructions that cause the at least one processor to perform operations to: determine that the workload does not meet bounded release criteria: set a resource release time for the workload and reclaim the set-aside resources upon expiration of the resource release time.

In Example 5, the subject matter of Examples 1-4 includes, the memory further comprising instructions that cause the at least one processor to perform operations to: set a resource preemption schedule for the set-aside resources assigned to the workload based on the priority category; determine that the priority category of the workload has changed; and adjust the resource preemption schedule.

In Example 6, the subject matter of Examples 1-5 includes, the memory further comprising instructions that cause the at least one processor to perform operations to: predict a future resource availability value for the node for a future time period; and determine the set-aside resources based in part on the future resource availability value.

In Example 7, the subject matter of Example 6 includes, the memory further comprising instructions that cause the at least one processor to perform operations to: identify execution parameters of workload tasks executing on the node; generate a distributed execution plan for the node using the execution parameters; and predict the future resource availability using the distributed execution plan.

In Example 8, the subject matter of Example 7 includes, wherein the distributed execution plan is expressed in meta-language or an interpreted language.

In Example 9, the subject matter of Examples 7-8 includes, wherein the distributed execution plan assigns tokens or credits to the tasks to limit priority category variation.

In Example 10, the subject matter of Examples 1-9 includes, the memory further comprising instructions that cause the at least one processor to perform operations to: maintain a set-aside resource availability register for the set-aside resources; and update the set-aside resource availability register based on the set-aside resources assigned to the workload.

In Example 11, the subject matter of Example 10 includes, the memory further comprising instructions that cause the at least one processor to perform operations to: determine that there are sufficient resources available at the node; assign resources to the workload from available resources of the node; reclaim the set-aside resources assigned to the workload; and adjust the set-aside resource availability register based on the set-aside resources reclaimed from the workload.

In Example 12, the subject matter of Examples 1-11 includes, the memory further comprising instructions that cause the at least one processor to perform operations to: collect telemetry data from the node; and evaluate the telemetry data to estimate resource usage of workloads executing on the node, wherein the available set-aside resources is determined in part using the estimated resource usage.

In Example 13, the subject matter of Examples 1-12 includes, the memory further comprising instructions that cause the at least one processor to perform operations to: identify quality of service metrics for the resource, wherein the available set-aside resources are determined in part using the quality of service metrics.

Example 14 is at least one machine-readable medium including instructions for limited duration resource allocation in an edge computing network that, when executed by at least one processor, cause the at least one processor to perform operations to: calculate available capacity for resources of a node of the edge computing network based on workloads executing on the node; determine available set-aside resources of the node based on the available capacity, wherein the available set-aside resources designate resources of the node to be assigned to a workload for a limited duration of time; receive a service request from an application executing on the edge computing node; determine a priority category for the service request; and assign, for a limited duration of time, a set-aside resource from the available set-aside resources of the node to a workload associated with the service request based on the priority category.

In Example 15, the subject matter of Example 14 includes, instructions that cause the at least one processor to perform operations to: determine that utilized resources of the node are outside a resource capacity threshold; and reclaim the set-aside resources from the workload.

In Example 16, the subject matter of Examples 14-15 includes, wherein the priority category is best effort and further comprising instructions that cause the at least one processor to perform operations to: assign a preemption delay to the set-aside resources assigned to the workload; receive a second service request with a higher priority category; reclaim the set-aside resources from the workload; and reassign the set-aside resources to a second workload associated with the second service request.

In Example 17, the subject matter of Examples 14-16 includes, instructions that cause the at least one processor to perform operations to: determine that the workload does not meet bounded release criteria; set a resource release time for the workload; and reclaim the set-aside resources upon expiration of the resource release time.

In Example 18, the subject matter of Examples 14-17 includes, instructions that cause the at least one processor to perform operations to: set a resource preemption schedule for the set-aside resources assigned to the workload based on the priority category; determine that the priority category of the workload has changed; and adjust the resource preemption schedule.

In Example 19, the subject matter of Examples 14-18 includes, instructions that cause the at least one processor to perform operations to: predict a future resource availability value for the node for a future time period; and determine the set-aside resources based in part on the future resource availability value.

In Example 20, the subject matter of Example 19 includes, instructions that cause the at least one processor to perform operations to: identify execution parameters of workload tasks executing on the node; generate a distributed execution plan for the node using the execution parameters; and predict the future resource availability using the distributed execution plan.

In Example 21, the subject matter of Example 20 includes, wherein the distributed execution plan is expressed in meta-language or an interpreted language.

In Example 22, the subject matter of Examples 20-21 includes, wherein the distributed execution plan assigns tokens or credits to the tasks to limit priority category variation.

In Example 23, the subject matter of Examples 14-22 includes, instructions that cause the at least one processor to perform operations to: maintain a set-aside resource availability register for the set-aside resources; and update the set-aside resource availability register based on the set-aside resources assigned to the workload.

In Example 24, the subject matter of Example 23 includes, instructions that cause the at least one processor to perform operations to: determine that there are sufficient resources available at the node; assign resources to the workload from available resources of the node; reclaim the set-aside resources assigned to the workload; and adjust the set-aside resource availability register based on the set-aside resources reclaimed from the workload.

In Example 25, the subject matter of Examples 14-24 includes, instructions that cause the at least one processor to perform operations to: collect telemetry data from the node; and evaluate the telemetry data to estimate resource usage of workloads executing on the node, wherein the available set-aside resources is determined in part using the estimated resource usage.

In Example 26, the subject matter of Examples 14-25 includes, instructions that cause the at least one processor to perform operations to: identify quality of service metrics for the resource, wherein the available set-aside resources are determined in part using the quality of service metrics.

Example 27 is a method for limited duration resource allocation in an edge computing network comprising: calculating available capacity for resources of a node of the edge computing network based on workloads executing on the node; determining available set-aside resources of the node based on the available capacity, wherein the available set-aside resources designate resources of the node to be assigned to a workload for a limited duration of time; receiving a service request from an application executing on the edge computing node; determining a priority category for the service request; and assigning, for a limited duration of time, a set-aside resource from the available set-aside resources of the node to a workload associated with the service request based on the priority category.

In Example 28, the subject matter of Example 27 includes, determining that utilized resources of the node are outside a resource capacity threshold; and reclaiming the set-aside resources from the workload.

In Example 29, the subject matter of Examples 27-28 includes, wherein the priority category is best effort and further comprising: assigning a preemption delay to the set-aside resources assigned to the workload; receiving a second service request with a higher priority category; reclaiming the set-aside resources from the workload; and reassigning the set-aside resources to a second workload associated with the second service request.

In Example 30, the subject matter of Examples 27-29 includes, determining that the workload does not meet bounded release criteria; setting a resource release time for the workload; and reclaiming the set-aside resources upon expiration of the resource release time.

In Example 31, the subject matter of Examples 27-30 includes, setting a resource preemption schedule for the set-aside resources assigned to the workload based on the priority category; determining that the priority category of the workload has changed; and adjusting the resource preemption schedule.

In Example 32, the subject matter of Examples 27-31 includes, predicting a future resource availability value for the node for a future time period; and determining the set-aside resources based in part on the future resource availability value.

In Example 33, the subject matter of Example 32 includes, identifying execution parameters of workload tasks executing on the node; generating a distributed execution plan for the node using the execution parameters; and predicting the future resource availability using the distributed execution plan.

In Example 34, the subject matter of Example 33 includes, wherein the distributed execution plan is expressed in meta-language or an interpreted language.

In Example 35, the subject matter of Examples 33-34 includes, wherein the distributed execution plan assigns tokens or credits to the tasks to limit priority category variation.

In Example 36, the subject matter of Examples 27-35 includes, maintaining a set-aside resource availability register for the set-aside resources; and updating the set-aside resource availability register based on the set-aside resources assigned to the workload.

In Example 37, the subject matter of Example 36 includes, determining that there are sufficient resources available at the node; assigning resources to the workload from available resources of the node; reclaiming the set-aside resources assigned to the workload; and adjusting the set-aside resource availability register based on the set-aside resources reclaimed from the workload.

In Example 38, the subject matter of Examples 27-37 includes, collecting telemetry data from the node; and evaluating the telemetry data to estimate resource usage of workloads executing on the node, wherein the available set-aside resources is determined in part using the estimated resource usage.

In Example 39, the subject matter of Examples 27-38 includes, identifying quality of service metrics for the resource, wherein the available set-aside resources are determined in part using the quality of service metrics.

Example 40 is at least one machine-readable medium including instructions that, when executed by a machine, cause the machine to perform any method of Examples 1-16.

Example 41 is a system comprising means to perform any method of Examples 1-16.

Example 42 is a system for limited duration resource allocation in an edge computing network comprising: means for calculating available capacity for resources of a node of the edge computing network based on workloads executing on the node; means for determining available set-aside resources of the node based on the available capacity, wherein the available set-aside resources designate resources of the node to be assigned to a workload for a limited duration of time; means for receiving a service request from an application executing on the edge computing node; means for determining a priority category for the service request; and means for assigning, for a limited duration of time, a set-aside resource from the available set-aside resources of the node to a workload associated with the service request based on the priority category.

In Example 43, the subject matter of Example 42 includes, means for determining that utilized resources of the node are outside a resource capacity threshold; and means for reclaiming the set-aside resources from the workload.

In Example 44, the subject matter of Examples 42-43 includes, wherein the priority category is best effort and further comprising: means for assigning a preemption delay to the set-aside resources assigned to the workload; means for receiving a second service request with a higher priority category; means for reclaiming the set-aside resources from the workload; and reassigning the set-aside resources to a second workload associated with the second service request.

In Example 45, the subject matter of Examples 42-44 includes, means for determining that the workload does not meet bounded release criteria; means for setting a resource release time for the workload; and means for reclaiming the set-aside resources upon expiration of the resource release time.

In Example 46, the subject matter of Examples 42-45 includes, means for setting a resource preemption schedule for the set-aside resources assigned to the workload based on the priority category; means for determining that the priority category of the workload has changed; and means for adjusting the resource preemption schedule.

In Example 47, the subject matter of Examples 42-46 includes, means for predicting a future resource availability value for the node for a future time period; and means for determining the set-aside resources based in part on the future resource availability value.

In Example 48, the subject matter of Example 47 includes, means for identifying execution parameters of workload tasks executing on the node; means for generating a distributed execution plan for the node using the execution parameters; and means for predicting the future resource availability using the distributed execution plan.

In Example 49, the subject matter of Example 48 includes, wherein the distributed execution plan is expressed in meta-language or an interpreted language.

In Example 50, the subject matter of Examples 48-49 includes, wherein the distributed execution plan assigns tokens or credits to the tasks to limit priority category variation.

In Example 51, the subject matter of Examples 42-50 includes, means for maintaining a set-aside resource availability register for the set-aside resources; and means for updating the set-aside resource availability register based on the set-aside resources assigned to the workload.

In Example 52, the subject matter of Example 51 includes, means for determining that there are sufficient resources available at the node; means for assigning resources to the workload from available resources of the node; means for reclaiming the set-aside resources assigned to the workload; and means for adjusting the set-aside resource availability register based on the set-aside resources reclaimed from the workload.

In Example 53, the subject matter of Examples 42-52 includes, means for collecting telemetry data from the node; and means for evaluating the telemetry data to estimate resource usage of workloads executing on the node, wherein the available set-aside resources is determined in part using the estimated resource usage.

In Example 54, the subject matter of Examples 42-53 includes, means for identifying quality of service metrics for the resource, wherein the available set-aside resources are determined in part using the quality of service metrics.

Example 55 is at least one machine-readable medium including instructions that, when executed by processing circuitry, cause the processing circuitry to perform operations to implement of any of Examples 1-54.

Example 56 is an apparatus comprising means to implement of any of Examples 1-54.

Example 57 is a system to implement of any of Examples 1-54.

Example 58 is a method to implement of any of Examples 1-54.

Example 59 is an apparatus of an edge computing system comprising: one or more processors and one or more computer-readable media comprising instructions that, when executed by the one or more processors, cause the one or more processors to perform any of the methods of Examples 1 to 54.

Example 60 is one or more computer-readable storage media comprising instructions to cause an electronic device of an edge computing system, upon execution of the instructions by one or more processors of the electronic device, to perform any of the limited duration resource allocation methods of Examples 1 to 54.

Example 61 is a computer program used in an edge computing system, the computer program comprising instructions, wherein execution of the program by a processing element in the edge computing system is to cause the processing element to perform any of the limited duration resource allocation methods of Examples 1 to 54.

Example 62 is an edge computing appliance device operating as a self-contained processing system, comprising a housing, case or shell, network communication circuitry, storage memory circuitry, and processor circuitry, adapted to perform any of the limited duration resource allocation methods of Examples 1 to 54.

Example 63 is an apparatus of an edge computing system comprising means to perform any of the limited duration resource allocation methods of Examples 1 to 54.

Example 64 is an apparatus of an edge computing system comprising logic, modules, or circuitry to perform any of the limited duration resource allocation methods of Examples 1 to 54.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. A system for limited duration resource allocation in an edge computing network comprising:
   at least one processor; and
   memory including instructions that, when executed by the at least one processor, cause the at least one processor to perform operations to:
   calculate available capacity for resources of a node of the edge computing network based on workloads executing on the node;
   determine available set-aside resources of the node based on the available capacity, wherein the available set-aside resources designate resources of the node to be assigned to a workload for a limited duration of time;
   receive a service request from an application executing on the node;
   predict a first resource release rate for the workloads executing on the node using predicted completion times of the workloads;
   determine a priority category for the service request based in-part on a second resource release rate of the application, wherein the second resource release rate is determined based on attestation parameters of the application; and
   assign, for a limited duration of time, a set-aside resource from the available set-aside resources of the node to a workload associated with the service request based on the priority category based on the first resource release rate.

2. The system of claim 1, wherein the priority category is best effort and the memory further comprising instructions that cause the at least one processor to perform operations to:
assign a preemption delay to the set-aside resources assigned to the workload;
receive a second service request with a higher priority category;
reclaim the set-aside resources from the workload; and
reassign the set-aside resources to a second workload associated with the second service request.

3. The system of claim 1, the memory further comprising instructions that cause the at least one processor to perform operations to:
set a resource preemption schedule for the set-aside resources assigned to the workload based on the priority category;
determine that the priority category of the workload has changed; and
adjust the resource preemption schedule.

4. The system of claim 1, the memory further comprising instructions that cause the at least one processor to perform operations to:
predict a future resource availability value for the node for a future time period; and
determine the set-aside resources based in part on the future resource availability value.

5. The system of claim 4, the memory further comprising instructions that cause the at least one processor to perform operations to:
identify execution parameters of workload tasks executing on the node;
generate a distributed execution plan for the node using the execution parameters; and
predict the future resource availability using the distributed execution plan.

6. The system of claim 1, the memory further comprising instructions that cause the at least one processor to perform operations to:
maintain a set-aside resource availability register for the set-aside resources; and
update the set-aside resource availability register based on the set-aside resources assigned to the workload.

7. The system of claim 6, the memory further comprising instructions that cause the at least one processor to perform operations to:
determine that there are sufficient resources available at the node;
assign resources to the workload from available resources of the node;
reclaim the set-aside resources assigned to the workload; and
adjust the set-aside resource availability register based on the set-aside resources reclaimed from the workload.

8. The system of claim 1, the memory further comprising instructions that cause the at least one processor to perform operations to:
collect telemetry data from the node; and
evaluate the telemetry data to estimate resource usage of workloads executing on the node, wherein the available set-aside resources is determined in part using the estimated resource usage.

9. At least one non-transitory machine-readable medium including instructions for limited duration resource allocation in an edge computing network that, when executed by at least one processor, cause the at least one processor to perform operations to:
calculate available capacity for resources of a node of the edge computing network based on workloads executing on the node;
determine available set-aside resources of the node based on the available capacity, wherein the available set-aside resources designate resources of the node to be assigned to a workload for a limited duration of time;
receive a service request from an application executing on the node;
predict a first resource release rate for the workloads executing on the node using predicted completion times of the workloads;
determine a priority category for the service request based in-part on a second resource release rate of the application, wherein the second resource release rate is determined based on attestation parameters of the application; and
assign, for a limited duration of time, a set-aside resource from the available set-aside resources of the node to a workload associated with the service request based on the priority category based on the first resource release rate.

10. The at least one non-transitory machine-readable medium of claim 9, wherein the priority category is best effort and further comprising instructions that cause the at least one processor to perform operations to:
assign a preemption delay to the set-aside resources assigned to the workload;
receive a second service request with a higher priority category;
reclaim the set-aside resources from the workload; and
reassign the set-aside resources to a second workload associated with the second service request.

11. The at least one non-transitory machine-readable medium of claim 9, further comprising instructions that cause the at least one processor to perform operations to:
set a resource preemption schedule for the set-aside resources assigned to the workload based on the priority category;
determine that the priority category of the workload has changed; and
adjust the resource preemption schedule.

12. The at least one non-transitory machine-readable medium of claim 9, further comprising instructions that cause the at least one processor to perform operations to:
predict a future resource availability value for the node for a future time period; and
determine the set-aside resources based in part on the future resource availability value.

13. The at least one non-transitory machine-readable medium of claim 12, further comprising instructions that cause the at least one processor to perform operations to:
identify execution parameters of workload tasks executing on the node;
generate a distributed execution plan for the node using the execution parameters; and
predict the future resource availability using the distributed execution plan.

14. The at least one non-transitory machine-readable medium of claim 9, further comprising instructions that cause the at least one processor to perform operations to:
maintain a set-aside resource availability register for the set-aside resources; and update the set-aside resource availability register based on the set-aside resources assigned to the workload.

15. The at least one non-transitory machine-readable medium of claim 14, further comprising instructions that cause the at least one processor to perform operations to:
determine that there are sufficient resources available at the node;
assign resources to the workload from available resources of the node;
reclaim the set-aside resources assigned to the workload; and
adjust the set-aside resource availability register based on the set-aside resources reclaimed from the workload.

16. The at least one non-transitory machine-readable medium of claim 9, further comprising instructions that cause the at least one processor to perform operations to:
collect telemetry data from the node; and
evaluate the telemetry data to estimate resource usage of workloads executing on the node, wherein the available set-aside resources is determined in part using the estimated resource usage.

17. A method for limited duration resource allocation in an edge computing network comprising:
calculating available capacity for resources of a node of the edge computing network based on workloads executing on the node;
determining available set-aside resources of the node based on the available capacity, wherein the available set-aside resources designate resources of the node to be assigned to a workload for a limited duration of time;
receiving a service request from an application executing on the node;
predicting a first resource release rate for the workloads executing on the node using predicted completion times of the workloads;
determining a priority category for the service request based in-part on a second resource release rate of the application, wherein the second resource release rate is determined based on attestation parameters of the application; and
assigning, for a limited duration of time, a set-aside resource from the available set-aside resources of the node to a workload associated with the service request based on the priority category based on the first resource release rate.

18. The method of claim 17, wherein the priority category is best effort and further comprising:
assigning a preemption delay to the set-aside resources assigned to the workload;
receiving a second service request with a higher priority category;
reclaiming the set-aside resources from the workload; and
reassigning the set-aside resources to a second workload associated with the second service request.

19. The method of claim 17, further comprising:
setting a resource preemption schedule for the set-aside resources assigned to the workload based on the priority category;
determining that the priority category of the workload has changed; and
adjusting the resource preemption schedule.

20. The method of claim 17, further comprising:
predicting a future resource availability value for the node for a future time period; and
determining the set-aside resources based in part on the future resource availability value.

21. The method of claim 20, further comprising:
identifying execution parameters of workload tasks executing on the node;
generating a distributed execution plan for the node using the execution parameters; and
predicting the future resource availability using the distributed execution plan.

22. The method of claim 17, further comprising:
maintaining a set-aside resource availability register for the set-aside resources; and
updating the set-aside resource availability register based on the set-aside resources assigned to the workload.

23. The method of claim 22, further comprising:
determining that there are sufficient resources available at the node;
assigning resources to the workload from available resources of the node;
reclaiming the set-aside resources assigned to the workload; and
adjusting the set-aside resource availability register based on the set-aside resources reclaimed from the workload.

24. The method of claim 17, further comprising:
collecting telemetry data from the node; and
evaluating the telemetry data to estimate resource usage of workloads executing on the node, wherein the available set-aside resources is determined in part using the estimated resource usage.

\* \* \* \* \*